United States Patent
Ward et al.

(10) Patent No.: US 9,880,696 B2
(45) Date of Patent: *Jan. 30, 2018

(54) SYSTEM FOR PROVIDING DYNAMIC LINKED PANELS IN USER INTERFACE

(71) Applicant: Palantir Technologies Inc., Palo Alto, CA (US)

(72) Inventors: Lindsay Ward, Santa Clara, CA (US); Derek Cicerone, New York, NY (US); Punyashloka Biswal, New Haven, CT (US); Sixin Li, New York, NY (US); Geoff Cameron, New York, NY (US); Adam Storr, Palo Alto, CA (US); Ashwin Ramaswamy, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/252,021

(22) Filed: Aug. 30, 2016

(65) Prior Publication Data

US 2016/0370951 A1    Dec. 22, 2016

Related U.S. Application Data

(63) Continuation of application No. 14/841,338, filed on Aug. 31, 2015, now Pat. No. 9,454,281.

(Continued)

(51) Int. Cl.
*G06F 15/00* (2006.01)
*G06F 13/00* (2006.01)
(Continued)

(52) U.S. Cl.
CPC ........ *G06F 3/0481* (2013.01); *G06F 17/2247* (2013.01); *G06F 17/2264* (2013.01);
(Continued)

(58) Field of Classification Search
CPC .................. G06F 3/0482; G06F 17/30424
(Continued)

(56) References Cited

U.S. PATENT DOCUMENTS 4,881,179 A    11/1989    Vincent
5,109,399 A     4/1992    Thompson
(Continued)

FOREIGN PATENT DOCUMENTS

AU    2013251186    11/2015
CN     102054015     5/2014
(Continued)

OTHER PUBLICATIONS

"A First Look: Predicting Market Demand for Food Retail using a Huff Analysis," TRF Policy Solutions, Jul. 2012, pp. 30.
(Continued)

*Primary Examiner* — Kevin Nguyen
(74) *Attorney, Agent, or Firm* — Knobbe, Martens, Olson & Bear, LLP

(57) ABSTRACT

A computer system may be configured to: execute a first query associated with a first panel; display the first panel in a user interface based on first display settings of the first panel, the first panel displaying at least a portion of the result of the first query, the result of the first query associated with a variable; execute a second query associated with a second panel, wherein the second query refers to the variable associated with the first query; display the second panel in the user interface based on second display settings of the second panel, the second panel displaying at least a portion of the result of the second query; and in response to user input changing the displayed result in the first panel: re-execute the second query; and update the display of the second panel in the user interface based on results of the re-executed second query.

14 Claims, 14 Drawing Sheets

US 9,880,696 B2

Page 2

Related U.S. Application Data

(60) Provisional application No. 62/045,488, filed on Sep. 3, 2014, provisional application No. 62/135,448, filed on Mar. 19, 2015.

(51) Int. Cl.
*G06F 3/0481* (2013.01)
*G06F 17/24* (2006.01)
*G09G 5/14* (2006.01)
*G06F 17/30* (2006.01)
*G06F 17/22* (2006.01)

(52) U.S. Cl.
CPC ...... *G06F 17/248* (2013.01); *G06F 17/30395* (2013.01); *G06F 17/30528* (2013.01); *G09G 5/14* (2013.01); *G09G 2354/00* (2013.01)

(58) Field of Classification Search
USPC ........ 715/762, 771, 780, 748, 763–765, 769
See application file for complete search history.

(56) References Cited

U.S. PATENT DOCUMENTS

| | | |
|---|---|---|
| 5,241,625 A | 8/1993 | Epard et al. |
| 5,329,108 A | 7/1994 | Lamoure |
| 5,632,009 A | 5/1997 | Rao et al. |
| 5,670,987 A | 9/1997 | Doi et al. |
| 5,781,704 A | 7/1998 | Rossmo |
| 5,798,769 A | 8/1998 | Chiu et al. |
| 5,845,300 A | 12/1998 | Comer |
| 5,974,572 A | 10/1999 | Weinberg et al. |
| 5,999,911 A | 12/1999 | Berg et al. |
| 6,025,844 A | 2/2000 | Parsons |
| 6,057,757 A | 5/2000 | Arrowsmith et al. |
| 6,065,026 A | 5/2000 | Cornelia et al. |
| 6,091,956 A | 7/2000 | Hollenberg |
| 6,101,479 A | 8/2000 | Shaw |
| 6,161,098 A | 12/2000 | Wallman |
| 6,219,053 B1 | 4/2001 | Tachibana et al. |
| 6,232,971 B1 | 5/2001 | Haynes |
| 6,237,138 B1 | 5/2001 | Hameluck et al. |
| 6,243,706 B1 | 6/2001 | Moreau et al. |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,370,538 B1 | 4/2002 | Lamping et al. |
| 6,430,305 B1 | 8/2002 | Decker |
| 6,456,997 B1 | 9/2002 | Shukla |
| 6,523,019 B1 | 2/2003 | Borthwick |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,665,683 B1 | 12/2003 | Meltzer |
| 6,674,434 B1 | 1/2004 | Chojnacki et al. |
| 6,714,936 B1 | 3/2004 | Nevin, III |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,850,317 B2 | 2/2005 | Mullins et al. |
| 6,877,137 B1 | 4/2005 | Rivette et al. |
| 6,944,777 B1 | 9/2005 | Belani et al. |
| 6,944,821 B1 | 9/2005 | Bates et al. |
| 6,967,589 B1 | 11/2005 | Peters |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,065,714 B1 | 6/2006 | Theel et al. |
| 7,086,028 B1 | 8/2006 | Davis et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski |
| 7,174,377 B2 | 2/2007 | Bernard et al. |
| 7,188,317 B1 | 3/2007 | Hazel |
| 7,194,680 B1 * | 3/2007 | Roy ..................... G06F 17/243 715/205 |
| 7,213,030 B1 | 5/2007 | Jenkins |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,392,254 B1 | 6/2008 | Jenkins |
| 7,426,654 B2 | 9/2008 | Adams et al. |
| 7,441,182 B2 | 10/2008 | Beilinson et al. |
| 7,441,219 B2 | 10/2008 | Perry et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,716,140 B1 | 5/2010 | Nielsen et al. |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,765,489 B1 | 7/2010 | Shah et al. |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,870,493 B2 | 1/2011 | Pall et al. |
| 7,877,421 B2 | 1/2011 | Berger et al. |
| 7,880,921 B2 | 2/2011 | Dattilo et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,336 B1 | 5/2011 | Robin-Jan |
| 7,966,199 B1 | 5/2011 | Frasher |
| 7,958,147 B1 | 6/2011 | Turner et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,010,545 B2 | 8/2011 | Stefik et al. |
| 8,015,487 B2 | 9/2011 | Roy et al. |
| 8,024,778 B2 | 9/2011 | Cash et al. |

(56) References Cited

U.S. PATENT DOCUMENTS

| | | |
|---|---|---|
| 8,036,632 B1 | 10/2011 | Cona et al. |
| 8,073,857 B2 | 12/2011 | Sreekanth |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,191,005 B2 | 5/2012 | Baier et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,392,556 B2 | 3/2013 | Goulet et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,527,949 B1 | 9/2013 | Pleis et al. |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripurapu et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,682,696 B1 | 3/2014 | Shanmugam |
| 8,688,573 B1 | 4/2014 | Rukonic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,732,574 B2 | 5/2014 | Burr et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,313 B2 | 8/2014 | Satlow |
| 8,799,799 B1 | 8/2014 | Cervelli et al. |
| 8,807,948 B2 | 8/2014 | Luo et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,930,874 B2 | 1/2015 | Duff et al. |
| 8,937,619 B2 | 1/2015 | Sharma et al. |
| 8,938,686 B1 | 1/2015 | Erenrich et al. |
| 8,984,390 B2 | 3/2015 | Aymeloglu et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,058,315 B2 | 6/2015 | Burr et al. |
| 9,116,975 B2 | 8/2015 | Shankar et al. |
| 9,165,100 B2 | 10/2015 | Begur et al. |
| 9,286,373 B2 | 3/2016 | Elliot et al. |
| 9,348,880 B1 | 5/2016 | Kramer et al. |
| 9,454,281 B2 | 9/2016 | Ward et al. |
| 2001/0021936 A1 | 9/2001 | Bertram |
| 2002/0032677 A1 | 3/2002 | Moregenthaler et al. |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0130907 A1 | 9/2002 | Chi et al. |
| 2002/0174201 A1 | 11/2002 | Ramer et al. |
| 2002/0194119 A1 | 12/2002 | Wright et al. |
| 2002/0196229 A1 | 12/2002 | Chen et al. |
| 2003/0028560 A1 | 2/2003 | Kudrolli et al. |
| 2003/0036927 A1 | 2/2003 | Bowen |
| 2003/0039948 A1 | 2/2003 | Donahue |
| 2003/0061132 A1 | 3/2003 | Mason et al. |
| 2003/0093755 A1 | 5/2003 | O'Carroll |
| 2003/0126102 A1 | 7/2003 | Borthwick |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0044648 A1 | 3/2004 | Anfindsen et al. |
| 2004/0064256 A1 | 4/2004 | Barinek et al. |
| 2004/0078451 A1 | 4/2004 | Dietz et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0163039 A1 | 8/2004 | Gorman |
| 2004/0181554 A1 | 9/2004 | Heckerman et al. |
| 2004/0193600 A1 | 9/2004 | Kaasten et al. |
| 2004/0205492 A1 | 10/2004 | Newsome |
| 2004/0221223 A1 | 11/2004 | Yu et al. |
| 2004/0236688 A1 | 11/2004 | Bozeman |
| 2004/0236711 A1 | 11/2004 | Nixon et al. |
| 2004/0243555 A1 | 12/2004 | Bolsius et al. |
| 2004/0260702 A1 | 12/2004 | Cragun et al. |
| 2004/0267746 A1 | 12/2004 | Marcjan et al. |
| 2005/0004911 A1 | 1/2005 | Goldberg et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039116 A1 | 2/2005 | Slack-Smith |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0091186 A1 | 4/2005 | Elish |
| 2005/0125715 A1 | 6/2005 | Franco et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0026561 A1 | 2/2006 | Bauman et al. |

(56) References Cited

U.S. PATENT DOCUMENTS

| | | |
|---|---|---|
| 2006/0031779 A1 | 2/2006 | Theurer et al. |
| 2006/0045470 A1 | 3/2006 | Poslinski et al. |
| 2006/0053097 A1 | 3/2006 | King et al. |
| 2006/0053170 A1 | 3/2006 | Hill et al. |
| 2006/0059139 A1 | 3/2006 | Robinson |
| 2006/0059423 A1 | 3/2006 | Lehmann et al. |
| 2006/0074866 A1 | 4/2006 | Chamberlain et al. |
| 2006/0074881 A1 | 4/2006 | Vembu et al. |
| 2006/0080139 A1 | 4/2006 | Mainzer |
| 2006/0080619 A1 | 4/2006 | Carlson et al. |
| 2006/0093222 A1 | 5/2006 | Saffer et al. |
| 2006/0106847 A1 | 5/2006 | Eckardt et al. |
| 2006/0129746 A1 | 6/2006 | Porter |
| 2006/0136513 A1 | 6/2006 | Ngo et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0149596 A1 | 7/2006 | Surpin et al. |
| 2006/0155654 A1 | 7/2006 | Plessis et al. |
| 2006/0178915 A1 | 8/2006 | Chao |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0265417 A1 | 11/2006 | Amato et al. |
| 2006/0271277 A1 | 11/2006 | Hu et al. |
| 2006/0277460 A1 | 12/2006 | Forstall et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0016363 A1 | 1/2007 | Huang et al. |
| 2007/0018986 A1 | 1/2007 | Hauser |
| 2007/0038646 A1 | 2/2007 | Thota |
| 2007/0038962 A1 | 2/2007 | Fuchs et al. |
| 2007/0043686 A1 | 2/2007 | Teng et al. |
| 2007/0057966 A1 | 3/2007 | Ohno et al. |
| 2007/0061752 A1 | 3/2007 | Cory |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0113164 A1 | 5/2007 | Hansen et al. |
| 2007/0136095 A1 | 6/2007 | Weinstein |
| 2007/0150369 A1 | 6/2007 | Zivin |
| 2007/0168871 A1 | 7/2007 | Jenkins |
| 2007/0174760 A1 | 7/2007 | Chamberlain et al. |
| 2007/0185850 A1 | 8/2007 | Walters et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0245339 A1 | 10/2007 | Bauman et al. |
| 2007/0266336 A1 | 11/2007 | Nojima et al. |
| 2007/0284433 A1 | 12/2007 | Domenica et al. |
| 2007/0294643 A1 | 12/2007 | Kyle |
| 2007/0299697 A1 | 12/2007 | Friedlander et al. |
| 2008/0016155 A1 | 1/2008 | Khalatian |
| 2008/0016216 A1 | 1/2008 | Worley et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0091693 A1 | 4/2008 | Murthy |
| 2008/0104019 A1 | 5/2008 | Nath |
| 2008/0109714 A1 | 5/2008 | Kumar et al. |
| 2008/0126951 A1 | 5/2008 | Sood et al. |
| 2008/0148398 A1 | 6/2008 | Mezack et al. |
| 2008/0155440 A1 | 6/2008 | Trevor et al. |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0249820 A1 | 10/2008 | Pathria et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288475 A1 | 11/2008 | Kim et al. |
| 2008/0301643 A1 | 12/2008 | Appleton et al. |
| 2008/0306711 A1 | 12/2008 | Bansal |
| 2008/0313132 A1 | 12/2008 | Hao et al. |
| 2008/0313243 A1 | 12/2008 | Poston et al. |
| 2009/0002492 A1 | 1/2009 | Velipasalar et al. |
| 2009/0024962 A1 | 1/2009 | Gotz |
| 2009/0027418 A1 | 1/2009 | Maru et al. |
| 2009/0030915 A1 | 1/2009 | Winter et al. |
| 2009/0031401 A1 | 1/2009 | Cudich et al. |
| 2009/0043801 A1 | 2/2009 | LeClair et al. |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0089651 A1 | 4/2009 | Herberger et al. |
| 2009/0106178 A1 | 4/2009 | Chu |
| 2009/0112678 A1 | 4/2009 | Luzardo |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150868 A1 | 6/2009 | Chakra et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0199106 A1 | 8/2009 | Jonsson et al. |
| 2009/0216562 A1 | 8/2009 | Faulkner et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0313463 A1 | 12/2009 | Pang et al. |
| 2009/0319891 A1 | 12/2009 | MacKinlay et al. |
| 2010/0004857 A1 | 1/2010 | Pereira et al. |
| 2010/0011282 A1 | 1/2010 | Dollard et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070844 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076813 A1 | 3/2010 | Ghosh et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |

(56) References Cited

U.S. PATENT DOCUMENTS

| | | |
|---|---|---|
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0198796 A1 | 8/2010 | Berersniewicz et al. |
| 2010/0199225 A1 | 8/2010 | Coleman et al. |
| 2010/0223260 A1 | 9/2010 | Wu |
| 2010/0228812 A1 | 9/2010 | Uomini |
| 2010/0238174 A1 | 9/2010 | Haub et al. |
| 2010/0250412 A1 | 9/2010 | Wagner |
| 2010/0262901 A1 | 10/2010 | DiSalvo |
| 2010/0280851 A1 | 11/2010 | Merkin |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0306722 A1 | 12/2010 | LeHoty et al. |
| 2010/0313119 A1 | 12/2010 | Baldwin et al. |
| 2010/0313239 A1 | 12/2010 | Chakra et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0029526 A1 | 2/2011 | Knight et al. |
| 2011/0047159 A1 | 2/2011 | Baid et al. |
| 2011/0047540 A1 | 2/2011 | Williams et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074788 A1 | 3/2011 | Regan et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0107196 A1 | 5/2011 | Foster |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0161409 A1 | 6/2011 | Nair et al. |
| 2011/0167105 A1 | 7/2011 | Ramakrishnan et al. |
| 2011/0167710 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0179048 A1 | 7/2011 | Satlow |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0225482 A1 | 9/2011 | Chan et al. |
| 2011/0238495 A1 | 9/2011 | Kang |
| 2011/0238553 A1 | 9/2011 | Raj et al. |
| 2011/0251951 A1 | 10/2011 | Kolkowitz |
| 2011/0258158 A1 | 10/2011 | Resende et al. |
| 2011/0270705 A1 | 11/2011 | Parker |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0004894 A1 | 1/2012 | Butler et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0059853 A1 | 3/2012 | Jagota |
| 2012/0065987 A1 | 3/2012 | Farooq et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084184 A1 | 4/2012 | Raleigh et al. |
| 2012/0106801 A1 | 5/2012 | Jackson |
| 2012/0117082 A1 | 5/2012 | Koperda et al. |
| 2012/0123989 A1 | 5/2012 | Yu et al. |
| 2012/0131512 A1 | 5/2012 | Takeuchi et al. |
| 2012/0137235 A1 | 5/2012 | Ts et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173985 A1 | 7/2012 | Peppel |
| 2012/0180002 A1 | 7/2012 | Campbell et al. |
| 2012/0188252 A1 | 7/2012 | Law |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0197657 A1 | 8/2012 | Prodanovich |
| 2012/0197660 A1 | 8/2012 | Prodanovich |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226590 A1 | 9/2012 | Love et al. |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0284345 A1 | 11/2012 | Costenaro et al. |
| 2012/0284670 A1 | 11/2012 | Kashik et al. |
| 2012/0290879 A1 | 11/2012 | Shibuya et al. |
| 2012/0296907 A1 | 11/2012 | Long et al. |
| 2012/0304244 A1 | 11/2012 | Xie et al. |
| 2012/0311684 A1 | 12/2012 | Paulsen et al. |
| 2012/0323829 A1 | 12/2012 | Stokes et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0055264 A1 | 2/2013 | Burr et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0097482 A1 | 4/2013 | Marantz et al. |
| 2013/0101159 A1 | 4/2013 | Rosen |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0124567 A1 | 5/2013 | Balinsky et al. |
| 2013/0150004 A1 | 6/2013 | Rosen |
| 2013/0151148 A1 | 6/2013 | Parundekar et al. |
| 2013/0151305 A1 | 6/2013 | Akinola et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |

(56) References Cited

U.S. PATENT DOCUMENTS

| | | |
|---|---|---|
| 2013/0187922 A1 | 7/2013 | Sexton |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0288719 A1 | 10/2013 | Alonzo |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0311375 A1 | 11/2013 | Priebatsch |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0089339 A1 | 3/2014 | Siddiqui et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129261 A1 | 5/2014 | Bothwell et al. |
| 2014/0129936 A1 | 5/2014 | Richards |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0208281 A1 | 7/2014 | Ming |
| 2014/0214579 A1 | 7/2014 | Shen et al. |
| 2014/0222521 A1 | 8/2014 | Chait |
| 2014/0222793 A1 | 8/2014 | Sadkin et al. |
| 2014/0244284 A1 | 8/2014 | Smith |
| 2014/0244388 A1 | 8/2014 | Manouchehri et al. |
| 2014/0267294 A1 | 9/2014 | Ma |
| 2014/0267295 A1 | 9/2014 | Sharma |
| 2014/0279824 A1 | 9/2014 | Tamayo |
| 2014/0282187 A1 | 9/2014 | MacKinlay et al. |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0358829 A1 | 12/2014 | Hurwitz |
| 2015/0019394 A1 | 1/2015 | Unser et al. |
| 2015/0026622 A1 | 1/2015 | Roaldson et al. |
| 2015/0046870 A1 | 2/2015 | Goldenberg et al. |
| 2015/0073954 A1 | 3/2015 | Braff |
| 2015/0089353 A1 | 3/2015 | Folkening |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0112998 A1 | 4/2015 | Shankar et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0186483 A1 | 7/2015 | Tappan et al. |
| 2015/0186821 A1 | 7/2015 | Wang et al. |
| 2015/0187036 A1 | 7/2015 | Wang et al. |
| 2015/0212663 A1* | 7/2015 | Papale .............. G06F 17/30424 715/762 |
| 2015/0227295 A1 | 8/2015 | Meiklejohn et al. |
| 2015/0227299 A1 | 8/2015 | Pourshahid |
| 2015/0254220 A1 | 9/2015 | Burr et al. |
| 2015/0278315 A1 | 10/2015 | Baumgartner et al. |
| 2015/0302051 A1 | 10/2015 | Baumgartner et al. |
| 2015/0309719 A1 | 10/2015 | Ma et al. |
| 2015/0317342 A1 | 11/2015 | Grossman et al. |
| 2015/0324868 A1 | 11/2015 | Kaftan et al. |
| 2016/0062555 A1 | 3/2016 | Ward et al. |
| 2016/0098176 A1 | 4/2016 | Cervelli et al. |
| 2016/0110369 A1 | 4/2016 | Cervelli et al. |
| 2016/0162519 A1 | 6/2016 | Stowe et al. |

FOREIGN PATENT DOCUMENTS

| | | |
|---|---|---|
| DE | 102014103482 | 9/2014 |
| DE | 102014215621 | 2/2015 |
| EP | 1672527 | 6/2006 |
| EP | 2551799 | 1/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2884439 | 6/2015 |
| EP | 2884440 | 6/2015 |
| EP | 2891992 | 7/2015 |
| EP | 2911078 | 8/2015 |
| EP | 2911100 | 8/2015 |
| EP | 2940603 | 11/2015 |
| EP | 2940609 | 11/2015 |
| EP | 2993595 | 3/2016 |
| EP | 3002691 | 4/2016 |
| EP | 3009943 | 4/2016 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 00/009529 | 2/2000 |
| WO | WO 01/025906 | 4/2001 |
| WO | WO 01/088750 | 11/2001 |
| WO | WO 02/065353 | 8/2002 |
| WO | WO 2005/104736 | 11/2005 |
| WO | WO 2007/133206 | 11/2007 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2010/030914 | 3/2010 |
| WO | WO 2012/119008 | 9/2012 |
| WO | WO 2013/010157 | 1/2013 |
| WO | WO 2013/102892 | 7/2013 |

OTHER PUBLICATIONS

"A Quick Guide to UniProtKB Swiss-Prot & TrEMBL," Sep. 2011, pp. 2.

"A Word About Banks and the Laundering of Drug Money," Aug. 18, 2012, http://www.golemxiv.co.uk/2012/08/a-word-about-banks-and-the-laundering-of-drug-money/.

"GrabUp—What a Timesaver!" http://atichris.com/191/grabup/, Aug. 11, 2008, pp. 3.

(56) References Cited

OTHER PUBLICATIONS

"Money Laundering Risks and E-Gaming: A European Overview and Assessment," 2009, http://www.cf.ac.uk/socsi/resources/Levi_Final_Money_Laundering_Risks_egaming.pdf.

"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf "Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

"The FASTA Program Package," fasta-36.3.4, Mar. 25, 2011, pp. 29.

"Using Whois Based Geolocation and Google Maps API for Support Cybercrime Investigations," http://wseas.us/e-library/conferences/2013/Dubrovnik/TELECIRC/TELECIRC-32.pdf Abbey, Kristen, "Review of Google Docs," May 1, 2007, pp. 2.

About 80 Minutes, "Palantir in a Number of Parts—Part 6—Graph," Mar. 21, 2013, pp. 1-6.

Acklen, Laura, "Absolute Beginner's Guide to Microsoft Word 2003," Dec. 24, 2003, pp. 15-18, 34-41, 308-316.

Adams et al., "Worklets: A Service-Oriented Implementation of Dynamic Flexibility in Workflows," R. Meersman, Z. Tani et al. (Eds.): OTM 2006, LNCS, 4275, pp. 291-308, 2006.

Alur et al., "Chapter 2: IBM InfoSphere DataStage Stages," IBM InfoSphere DataStage Data Flow and Job Design, Jul. 1, 2008, pp. 35-137.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Ananiev et al., "The New Modality API," http://web.archive.org/web/20061211011958/http://java.sun.com/developer/technicalArticles/J2SE/Desktop/javase6/modality/ Jan. 21, 2006, pp. 8.

Bluttman et al., "Excel Formulas and Functions for Dummies," 2005, Wiley Publishing, Inc., pp. 280, 284-286.

Boyce, Jim, "Microsoft Outlook 2010 Inside Out," Aug. 1, 2010, retrieved from the internet https://capdtron.files.wordpress.com/2013/01/outlook-2010-inside_out.pdf.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Canese et al., "Chapter 2: PubMed: The Bibliographic Database," The NCBI Handbook, Oct. 2002, pp. 1-10.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Chen et al., "Bringing Order to the Web: Automatically Categorizing Search Results," CHI 2000, Proceedings of the SIGCHI conference on Human Factors in Computing Systems, Apr. 1-6, 2000, The Hague, the Netherlands, pp. 145-152.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Conner, Nancy, "Google Apps: The Missing Manual," May 1, 2008, pp. 15.

Definition "Identify" downloaded Jan. 22, 2015, 1 page.

Definition "Overlay" downloaded Jan. 22, 2015, 1 page.

Delcher et al., "Identifying Bacterial Genes and Endosymbiont DNA with Glimmer," BioInformatics, vol. 23, No. 6, 2007, pp. 673-679.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

Ferreira et al., "A Scheme for Analyzing Electronic Payment Systems," Basil 1997.

Galliford, Miles, "SnagIt Versus Free Screen Capture Software: Critical Tools for Website Owners," http://www.subhub.com/articles/free-screen-capture-software, Mar. 27, 2008, pp. 11.

Gesher, Ari, "Palantir Screenshots in the Wild: Swing Sightings," The Palantir Blog, Sep. 11, 2007, pp. 1-12.

GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.

Goswami, Gautam, "Quite Writly Said!," One Brick at a Time, Aug. 21, 2005, pp. 7.

Griffith, Daniel A., "A Generalized Huff Model," Geographical Analysis, Apr. 1982, vol. 14, No. 2, pp. 135-144.

Gu et al., "Record Linkage: Current Practice and Future Directions," Jan. 15, 2004, pp. 32.

Hansen et al. "Analyzing Social Media Networks with NodeXL: Insights from a Connected World", Chapter 4, pp. 53-67 and Chapter 10, pp. 143-164, published Sep. 2010.

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.

Hibbert et al., "Prediction of Shopping Behavior Using a Huff Model Within a GIS Framework," Healthy Eating in Context, Mar. 18, 2011, pp. 16.

Hogue et al., "Thresher: Automating the Unwrapping of Semantic Content from the World Wide Web," 14th International Conference on World Wide Web, WWW 2005: Chiba, Japan, May 10-14, 2005, pp. 86-95.

Hua et al., "A Multi-attribute Data Structure with Parallel Bloom Filters for Network Services" HiPC 2006, LNCS 4297, pp. 277-288, 2006.

Huang et al., "Systematic and Integrative Analysis of Large Gene Lists Using DAVID Bioinformatics Resources," Nature Protocols, 4.1, 2008, 44-57.

Huff et al., "Calibrating the Huff Model Using ArcGIS Business Analyst," ESRI, Sep. 2008, pp. 33.

Huff, David L., "Parameter Estimation in the Huff Model," ESRI, ArcUser, Oct.-Dec. 2003, pp. 34-36.

JetScreenshot.com, "Share Screenshots via Internet in Seconds," http://web.archive.org/web/20130807164204/http://www.jetscreenshot.com/, Aug. 7, 2013, pp. 1.

Kahan et al., "Annotea: an open RDF infrastructure for shared WEB annotations", Computer Networks 39, pp. 589-608, 2002.

Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.

Keylines.com, "KeyLines Datasheet," Mar. 2014, <http://keylines.com/wp-content/uploads/2014/03/KeyLines-datasheet.pdf> downloaded May 12, 2014 in 2 pages.

Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.

Kitts, Paul, "Chapter 14: Genome Assembly and Annotation Process," The NCBI Handbook, Oct. 2002, pp. 1-21.

Kwout, http://web.archive.org/web/20080905132448/http://www.kwout.com/ Sep. 5, 2008, pp. 2.

Li et al., "Interactive Multimodal Visual Search on Mobile Device," IEEE Transactions on Multimedia, vol. 15, No. 3, Apr. 1, 2013, pp. 594-607.

Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.

Madden, Tom, "Chapter 16: The BLAST Sequence Analysis Tool," The NCBI Handbook, Oct. 2002, pp. 1-15.

Manno et al., "Introducing Collaboration in Single-user Applications through the Centralized Control Architecture," 2010, pp. 10.

(56) References Cited

OTHER PUBLICATIONS

Manske, "File Saving Dialogs," <http://www.mozilla.org/editor/ui_specs/FileSaveDialogs.html>, Jan. 20, 1999, pp. 7.
Map Builder, "Rapid Mashup Development Tool for Google and Yahoo Maps!" http://web.archive.org/web/20090626224734/http://www.mapbuilder.net/ printed Jul. 20, 2012 in 2 pages.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Microsoft Windows, "Microsoft Windows Version 2002 Print Out 2," 2002, pp. 1-6.
Microsoft, "Registering an Application to a URI Scheme," http://msdn.microsoft.com/en-us/library/aa767914.aspx, printed Apr. 4, 2009 in 4 pages.
Microsoft, "Using the Clipboard," http://msdn.microsoft.com/en-us/library/ms649016.aspx, printed Jun. 8, 2009 in 20 pages.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents," 2002, 6 pages.
Nitro, "Trick: How to Capture a Screenshot as PDF, Annotate, Then Share It," http://blog.nitropdf.com/2008/03/04/trick-how-to-capture-a-screenshot-as-pdf-annotate-it-then-share/, Mar. 4, 2008, pp. 2.
Nolan et al., "MCARTA: A Malicious Code Automated Run-Time Analysis Framework," Homeland Security, 2012 IEEE Conference on Technologies for, Nov. 13, 2012, pp. 13-17.
Olanoff, Drew, "Deep Dive with the New Google Maps for Desktop with Google Earth Integration, It's More than Just a Utility," May 15, 2013, pp. 1-6, retrieved from the Internet: http://web.archive.org/web/20130515230641/http://techcrunch.com/2013/05/15/deep-dive-with-the-new-google-maps-for-desktop-with-google-earth-integration-its-more-than-just-a-utility/.
Online Tech Tips, "Clip2Net—Share files, folders and screenshots easily," http://www.online-tech-tips.com/free-software-downloads/share-files-folders-screenshots/, Apr. 2, 2008, pp. 5.
O'Reilly.com, http://oreilly.com/digitalmedia/2006/01/01/mac-os-x-screenshot-secrets.html published Jan. 1, 2006 in 10 pages.
Palantir Technologies, "Palantir Labs—Timeline," Oct. 1, 2010, retrieved from the internet https://www.youtube.com/watch?v=JCgDW5bru9M.
Palmas et al., "An Edge-Bunding Layout for Interactive Parallel Coordinates" 2014 IEEE Pacific Visualization Symposium, pp. 57-64.
Perdisci et al., "Behavioral Clustering of HTTP-Based Malware and Signature Generation Using Malicious Network Traces," USENIX, Mar. 18, 2010, pp. 1-14.
Quest, "Toad for ORACLE 11.6—Guide to Using Toad," Sep. 24, 2012, pp. 1-162.
Rouse, Margaret, "OLAP Cube," <http://searchdatamanagement.techtarget.com/definition/OLAP-cube>, Apr. 28, 2012, pp. 16.
Schroder, Stan, "15 Ways to Create Website Screenshots," http://mashable.com/2007/08/24/web-screenshots/, Aug. 24, 2007, pp. 2.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
SnagIt, "SnagIt 8.1.0 Print Out 2," Software release date Jun. 15, 2006, pp. 1-3.
SnagIt, "SnagIt 8.1.0 Print Out," Software release date Jun. 15, 2006, pp. 6.
SnagIt, "SnagIt Online Help Guide," http://download.techsmith.com/snagit/docs/onlinehelp/enu/snagit_help.pdf, TechSmith Corp., Version 8.1, printed Feb. 7, 2007, pp. 284.
Symantec Corporation, "E-Security Begins with Sound Security Policies," Announcement Symantec, Jun. 14, 2001.
Thompson, Mick, "Getting Started with GEO," Getting Started with GEO, Jul. 26, 2011.
Umagandhi et al., "Search Query Recommendations Using Hybrid User Profile with Query Logs," International Journal of Computer Applications, vol. 80, No. 10, Oct. 1, 2013, pp. 7-18.
Wang et al., "Research on a Clustering Data De-Duplication Mechanism Based on Bloom Filter," IEEE 2010, 5 pages.
Warren, Christina, "TUAW Faceoff: Screenshot apps on the firing line," http://www.tuaw.com/2008/05/05/tuaw-faceoff-screenshot-apps-on-the-firing-line/, May 5, 2008, pp. 11.
Wikipedia, "Federated Database System," Sep. 7, 2013, retrieved from the internet on Jan. 27, 2015 http://en.wikipedia.org/w/index.php?title=Federated_database_system&oldid=571954221.
Wright et al., "Palantir Technologies VAST 2010 Challenge Text Records—Investigations into Arms Dealing," Oct. 29, 2010, pp. 1-10.
Yang et al., "HTML Page Analysis Based on Visual Cues," 2001, pp. 859-864.
Notice of Acceptance for Australian Patent Application No. 2013251186 dated Nov. 6, 2015.
Notice of Acceptance for Australian Patent Application No. 2014250678 dated Oct. 7, 2015.
Notice of Allowance for U.S. Appl. No. 12/556,318 dated Apr. 11, 2016.
Notice of Allowance for U.S. Appl. No. 12/556,318 dated Nov. 2, 2015.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/148,568 dated Aug. 26, 2015.
Notice of Allowance for U.S. Appl. No. 14/192,767 dated Dec. 16, 2014.
Notice of Allowance for U.S. Appl. No. 14/192,767 dated Apr. 20, 2015.
Notice of Allowance for U.S. Appl. No. 14/225,084 dated May 4, 2015.
Notice of Allowance for U.S. Appl. No. 14/265,637 dated Feb. 13, 2015.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/326,738 dated Nov. 18, 2015.
Notice of Allowance for U.S. Appl. No. 14/473,552 dated Jul. 24, 2015.
Notice of Allowance for U.S. Appl. No. 14/473,860 dated Jan. 5, 2015.
Notice of Allowance for U.S. Appl. No. 14/486,991 dated May 1, 2015.
Notice of Allowance for U.S. Appl. No. 14/504,103 dated May 18, 2015.

(56) References Cited

OTHER PUBLICATIONS

Notice of Allowance for U.S. Appl. No. 14/552,336 dated Nov. 3, 2015.
Notice of Allowance for U.S. Appl. No. 14/616,080 dated Apr. 2, 2015.
Notice of Allowance for U.S. Appl. No. 14/676,621 dated Feb. 10, 2016.
Notice of Allowance for U.S. Appl. No. 14/961,481 dated May 2, 2016.
Official Communication for Australian Patent Application No. 2013251186 dated Mar. 12, 2015.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for Canadian Patent Application No. 2831660 dated Jun. 9, 2015.
Official Communication for European Patent Application No. 12181585.6 dated Sep. 4, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189344.6 dated Feb. 29, 2016.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 14199182.8 dated Mar. 13, 2015.
Official Communication for European Patent Application No. 15155845.9 dated Oct. 6, 2015.
Official Communication for European Patent Application No. 15155846.7 dated Jul. 8, 2015.
Official Communication for European Patent Application No. 15165244.3 dated Aug. 27, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15183721.8 dated Nov. 23, 2015.
Official Communication for European Patent Application No. 15188106.7 dated Feb. 3, 2016.
Official Communication for European Patent Application No. 15190307.7 dated Feb. 19, 2016.
Official Communication for Great Britain Patent Application No. 1404457.2 dated Aug. 14, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Great Britain Patent Application No. 1404499.4 dated Aug. 20, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2011729 dated Aug. 13, 2015.
Official Communication for Netherlands Patent Application No. 2012437 dated Sep. 18, 2015.
Official Communication for Netherlands Patent Application No. 2012438 dated Sep. 21, 2015.
Official Communication for Netherlands Patent Application No. 2013306 dated Apr. 24, 2015.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Aug. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/556,318 dated Jul. 2, 2015.
Official Communication for U.S. Appl. No. 12/556,321 dated Feb. 25, 2016.
Official Communication for U.S. Appl. No. 12/556,321 dated Jun. 6, 2012.
Official Communication for U.S. Appl. No. 12/556,321 dated Dec. 7, 2011.
Official Communication for U.S. Appl. No. 12/556,321 dated Jul. 7, 2015.
Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/669,274 dated May 2, 2016.

(56) References Cited

OTHER PUBLICATIONS

Official Communication for U.S. Appl. No. 13/669,274 dated Aug. 26, 2015.
Official Communication for U.S. Appl. No. 13/669,274 dated May 6, 2015.
Official Communication for U.S. Appl. No. 13/827,491 dated Jun. 22, 2015.
Official Communication for U.S. Appl. No. 13/827,491 dated Oct. 9, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/102,394 dated Mar. 27, 2014.
Official Communication for U.S. Appl. No. 14/108,187 dated Apr. 17, 2014.
Official Communication for U.S. Appl. No. 14/108,187 dated Mar. 20, 2014.
Official Communication for U.S. Appl. No. 14/134,558 dated Oct. 7, 2015.
Official Communication for U.S. Appl. No. 14/135,289 dated Apr. 16, 2014.
Official Communication for U.S. Appl. No. 14/135,289 dated Jul. 7, 2014.
Official Communication for U.S. Appl.No. 14/148,568 dated Oct. 22, 2014.
Official Communication for U.S. Appl. No. 14/148,568 dated Mar. 26, 2015.
Official Communication for U.S. Appl. No. 14/192,767 dated Sep. 24, 2014.
Official Communication for U.S. Appl. No. 14/192,767 dated May 6, 2014.
Official Communication for U.S. Appl. No. 14/196,814 dated May 5, 2015.
Official Communication for U.S. Appl. No. 14/222,364 dated Dec. 9, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/265,637 dated Sep. 26, 2014.
Official Communication for U.S. Appl. No. 14/268,964 dated Sep. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,596 dated Aug. 5, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Sep. 14, 2015.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Feb. 19, 2015.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/332,306 dated May 20, 2016.
Official Communication for U.S. Appl. No. 14/473,552 dated Feb. 24, 2015.
Official Communication for U.S. Appl. No. 14/479,160 dated Apr. 20, 2016.
Official Communication for U.S. Appl. No. 14/486,991 dated Mar. 10, 2015.
Official Communication for U.S. Appl. No. 14/490,612 dated Aug. 18, 2015.

(56) References Cited

OTHER PUBLICATIONS

Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/552,336 dated Jul. 20, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/715,834 dated Apr. 13, 2016.
Official Communication for U.S. Appl. No. 14/715,834 dated Feb. 19, 2016.
Official Communication for U.S. Appl. No. 14/726,353 dated Sep. 10, 2015.
Official Communication for U.S. Appl. No. 14/741,256 dated Feb. 9, 2016.
Official Communication for U.S. Appl. No. 14/800,447 dated Dec. 10, 2015.
Official Communication for U.S. Appl. No. 14/800,447 dated Mar. 3, 2016.
Official Communication for U.S. Appl. No. 14/800,447 dated Jun. 6, 2016.
Official Communication for U.S. Appl. No. 14/813,749 dated Sep. 28, 2015.
Official Communication for U.S. Appl. No. 14/841,338 dated Feb. 18, 2016.
Official Communication for U.S. Appl. No. 14/842,734 dated Nov. 19, 2015.
Official Communication for U.S. Appl. No. 14/871,465 dated Apr. 11, 2016.
Official Communication for U.S. Appl. No. 14/871,465 dated Feb. 9, 2016.
Official Communication for U.S. Appl. No. 14/883,498 dated Mar. 17, 2016.
Official Communication for U.S. Appl. No. 14/883,498 dated Dec. 24, 2015.
Official Communication for U.S. Appl. No. 14/961,481 dated Mar. 2, 2016.
Official Communication for U.S. Appl. No. 14/975,215 dated May 19, 2016.
Restriction Requirement for U.S. Appl. No. 13/839,026 dated Apr. 2, 2015.
Official Communication for U.S. Appl. No. 14/196,814 dated Aug. 13, 2014.
Official Communication for U.S. Appl. No. 14/268,964 dated Jul. 11, 2014.
Cox et al., "Step by Step Microsoft Access 2013," 2013, Microsoft Press, 448 pages.
Groh, "Microsoft Access 2010 Bible," 2010, Wiley Publishing Inc., 1395 pages. [Uploaded in 3 parts].
Harvey, "Excel 2010 All-in-One for Dummies," 2010, Wiley Publishing, Inc., 795 pages.
Red Gate, "Analyzing Change Impact with SQL Dependency Tracker," Dec. 22, 2010, https://web.archive.org/web/20101222043638/http://www.red-gate.com/products/sql-development/sql-dependency-tracker/screenshots, 5 pages.
Red Gate, "SQL Dependency Tracker 2.5," Dec. 22, 2010, https://web.archive.org/web/201012151355/http://www.red-gate/com/products/sql-development/sql-dependency-tracker/, 2 pages.
Red Gate, "Understanding the Diagram," May 14, 2015, https://web.archivee.org/web/20150514124543/http://documentation.red-gate.com/display/SDT2/Understanding+the+diagram, 3 pages.
Red Gate, "Worked Example—A Simple Analysis," Dec. 2, 2014, https://web.archive.org/web/20141202121918/http://documentation.red-gate.com/display/SDT2/Worked+example+-++a+simple+analysis, 9 pages.
Sempf, "Visual Basic 2005 for Dummies," 2006, Wiley Publishing Inc., 385 pages.
Simpson, "Access VBA Programming for Dummies," 2004, Wiley Publishing Inc., 410 pages. [Uploaded in 2 parts].
Official Communication for European Patent Application No. 15183721.8 dated Jan. 13, 2017.
Official Communication for U.S. Appl. No. 15/250,678 dated Jul. 11, 2017.
Official Communication for U.S. Appl. No. 15/250,678 dated Dec. 22, 2016.

* cited by examiner

Document 1

Queries | *Global Variables* | Document CSS

PANELS p1
p2
p3
. . .

COMPANY STOCK PRICE          $125,000

YOUR EQUITY VALUE:           $9 BILLION

COMPANY VALUATION:

| GLOBAL VARIABLES | | |
|---|---|---|
| NAME | DEFAULT VALUE | |
| options | 100000 | x |
| strike | 4.75 | x |

COMPANY A
$23 BILLION

COMPANY D
$370 BILLION

Document 1

Queries | Global Variables | Document CSS

PANELS p1
p2
p3
...

COMPANY STOCK PRICE

YOUR EQUITY VALUE:

COMPANY VALUATION:

| COMPANY A | COMPANY B |
|---|---|
| $23 BILLION | $65 BILLION |

100% ▼

240

DOCUMENT CSS
1  sl-markdown {
2      height: 100%;
3  }
4  #w2, #w5, #w7, #w8, #w11 {
5      text-align: center;
6  }
7  }
8
9  #w5 div, #w7 div, #w8 div, #w11 div {
10     height: 100%;
11     background: #87E587;
12     padding-top: 22px;
13 }
14
15 #w1 .irs-line {
16     background: #87E587;
17 }

FIG. 2D

SYSTEM FOR PROVIDING DYNAMIC LINKED PANELS IN USER INTERFACE

INCORPORATION BY REFERENCE TO ANY PRIORITY APPLICATIONS

This application is a continuation of U.S. patent application Ser. No. 14/841,338, filed Aug. 31, 2015, which claims the benefit of U.S. Provisional Application No. 62/045,488, filed Sep. 3, 2014 and U.S. Provisional Application No. 62/135,448, filed Mar. 19, 2015, each of which is incorporated herein by reference in its entirety. Any and all applications, if any, for which a foreign or domestic priority claim is identified in the Application Data Sheet of the present application are hereby incorporated by reference under 37 CFR 1.57.

TECHNICAL FIELD

The present disclosure relates to systems and techniques for data integration, analysis, and visualization. More specifically, the present disclosure relates to dynamic linked panels associated with queries performed on data sources and visualization of results of the queries.

BACKGROUND

Organizations and/or companies are producing increasingly large amounts of data. Such data may be queried and presented in a user interface.

SUMMARY

The systems, methods, and devices described herein each have several aspects, no single one of which is solely responsible for its desirable attributes. Without limiting the scope of this disclosure, several non-limiting features will now be discussed briefly.

In one embodiment, a computer system configured to display data from one or more data sources comprises: one or more hardware computer processors configured to execute code in order to cause the system to: generate a user interface configured to display a plurality of panels including a first panel and a second panel, each of the plurality of panels having respective display settings and queries including code for querying one more data sources; execute a first query associated with the first panel; display the first panel in the user interface based on first display settings of the first panel, the first panel displaying at least a portion of the result of the first query, the result of the first query being associated with a variable; execute a second query associated with the second panel, wherein the second query refers to the variable associated with the first query of the first panel; display the second panel in the user interface based on second display settings of the second panel, the second panel displaying at least a portion of the result of the second query; and in response to user input changing the displayed result in the first panel: re-execute the second query associated with the second panel; and update the display of the second panel in the user interface based on results of the re-executed second query of the second panel.

According to certain aspects, the code can be further configured to: receive a third query from the first panel for writing data to the one or more data sources; process one or more parameters in the third query by invoking a function; and perform the third query with the processed one or more parameters to write data to the one or more data sources. The processing of the one or more parameters in the third query may be performed at least in part by: replacing the one or more parameters with respective placeholders; and storing respective values corresponding to the one or more parameters in an array. The processing of the one or more parameters in the third query may be performed at least in part by changing respective values corresponding to the one or more parameters to string format. Each of the plurality of panels can be referenced as a template that is rendered by a template engine, and the function can be registered with the template engine. The code may be further configured to: prior to running the query of the first panel, invoke one or more functions to determine whether a table, a row, or a column referenced in the query exists in the one or more data sources.

In another embodiment, a method of displaying data from one or more data sources comprises: using one or more hardware computer processors: generating a user interface configured to display a plurality of panels including a first panel and a second panel, each of the plurality of panels having respective display settings and queries including code for querying one more data sources; executing a first query associated with the first panel; displaying the first panel in the user interface based on first display settings of the first panel, the first panel displaying at least a portion of the result of the first query, the result of the first query being associated with a variable; executing a second query associated with the second panel, wherein the second query refers to the variable associated with the first query of the first panel; displaying the second panel in the user interface based on second display settings of the second panel, the second panel displaying at least a portion of the result of the second query; and in response to user input changing the displayed result in the first panel: re-executing the second query associated with the second panel; and updating the display of the second panel in the user interface based on results of the re-executed second query of the second panel.

According to certain aspects, the method may further comprise: receiving a third query from the first panel for writing data to the one or more data sources; processing one or more parameters in the third query by invoking a function; and performing the third query with the processed one or more parameters to write data to the one or more data sources. Said processing the one or more parameters in the third query can comprise: replacing the one or more parameters with respective placeholders; and storing respective values corresponding to the one or more parameters in an array. Said processing the one or more parameters in the third query can comprise changing respective values corresponding to the one or more parameters to string format. Each of the plurality of panels may be referenced as a template that is rendered by a template engine, and the function may be registered with the template engine. The method may further comprise: prior to running the query of the first panel, invoking one or more functions to determine whether a table, a row, or a column referenced in the query exists in the one or more data sources.

In some embodiments, a non-transitory compute readable medium comprises instructions for displaying data from one or more data sources that cause a computer processor to: generate a user interface configured to display a plurality of panels including a first panel and a second panel, each of the plurality of panels having respective display settings and queries including code for querying one more data sources; execute a first query associated with the first panel; display the first panel in the user interface based on first display settings of the first panel, the first panel displaying at least a portion of the result of the first query, the result of the first query being associated with a variable; execute a second query associated with the second panel, wherein the second query refers to the variable associated with the first query of the first panel; display the second panel in the user interface based on second display settings of the second panel, the second panel displaying at least a portion of the result of the second query; and in response to user input changing the displayed result in the first panel: re-execute the second query associated with the second panel; and update the display of the second panel in the user interface based on results of the re-executed second query of the second panel.

According to certain aspects, the instructions can be further configured to cause the computer processor to: receive a third query from the first panel for writing data to the one or more data sources; process one or more parameters in the third query by invoking a function; and perform the third query with the processed one or more parameters to write data to the one or more data sources. The processing of the one or more parameters in the third query may be performed at least in part by: replacing the one or more parameters with respective placeholders; and storing respective values corresponding to the one or more parameters in an array. The processing of the one or more parameters in the third query may be performed at least in part by changing respective values corresponding to the one or more parameters to string format. Each of the plurality of panels can be referenced as a template that is rendered by a template engine, and the function can be registered with the template engine. The instructions may be further configured to cause the computer processor to: prior to running the query of the first panel, invoke one or more functions to determine whether a table, a row, or a column referenced in the query exists in the one or more data sources.

BRIEF DESCRIPTION OF THE DRAWINGS

FIGS. 2A-2D illustrate one embodiment of a user interface of a dashboard creation system for creating a dynamic panel.

DETAILED DESCRIPTION

Disclosed herein are various systems and methods for providing a plurality of dynamic panels in a user interface (UI). The dynamic panels (or "panels") can display different pieces of data from one or more data sources. For example, a query can be run on one or more data sources, and different parts of the result from the query can be output using different dynamic panels. For instance, each dynamic panel can be associated with a variable to output. Different types of dynamic panels can be provided, such as charts (e.g., line chart, bar chart, etc.), controls (e.g., dropdown, multiselect box, search box, etc.), maps, tables, text boxes, etc. The panels can be data source agnostic. For example, the panels can be associated with data from different types of data sources, such as relational databases (e.g., SQL Server), Elasticsearch, etc. In some embodiments, individual panels may each be referred to as "widgets." In some embodiments, the user interface including multiple panels may be referred to as a "dashboard."

Figure 1:
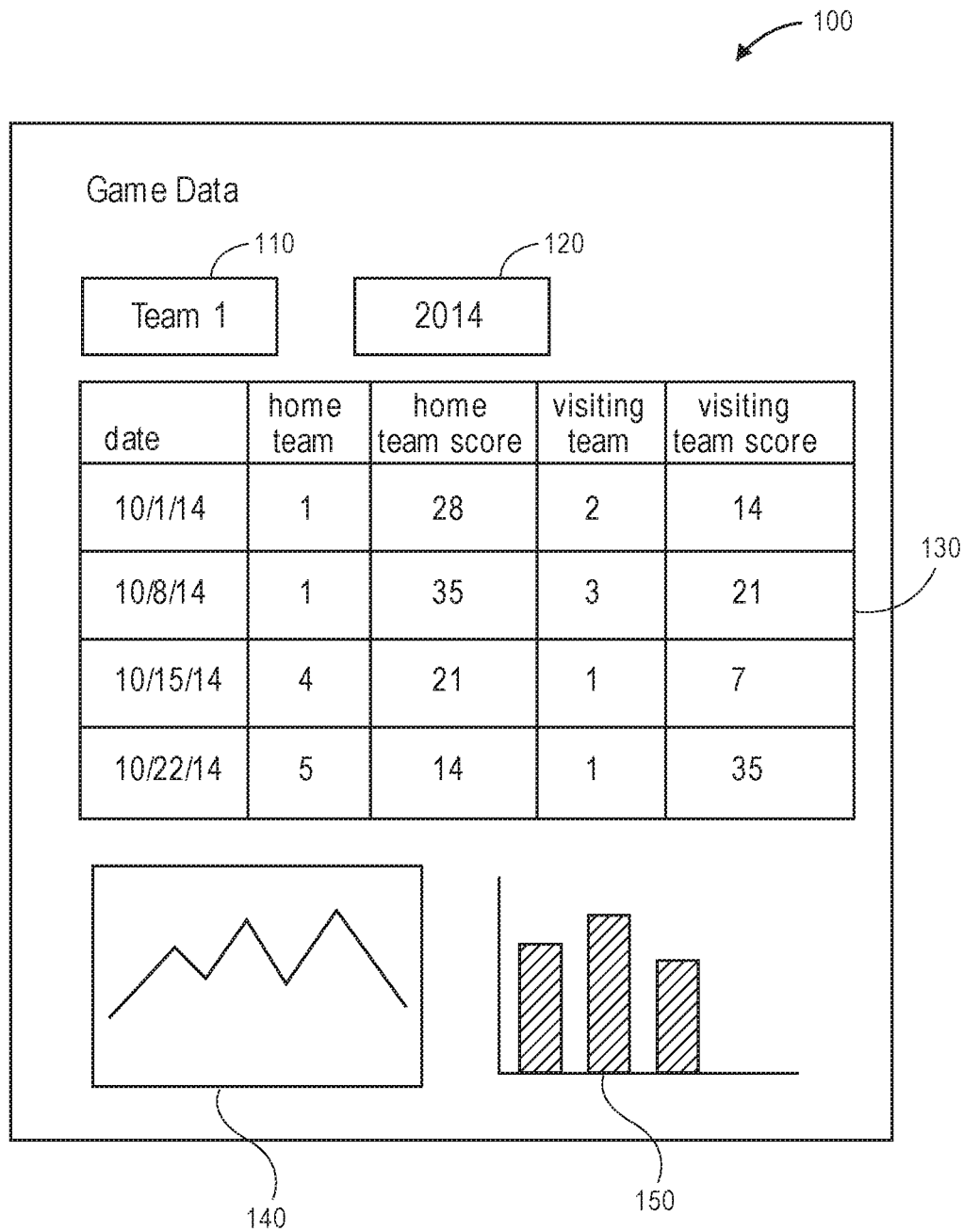
FIG. 1 illustrates one embodiment of a user interface comprising dynamic panels for displaying results of queries performed on one or more data sources.
Figure 7A:
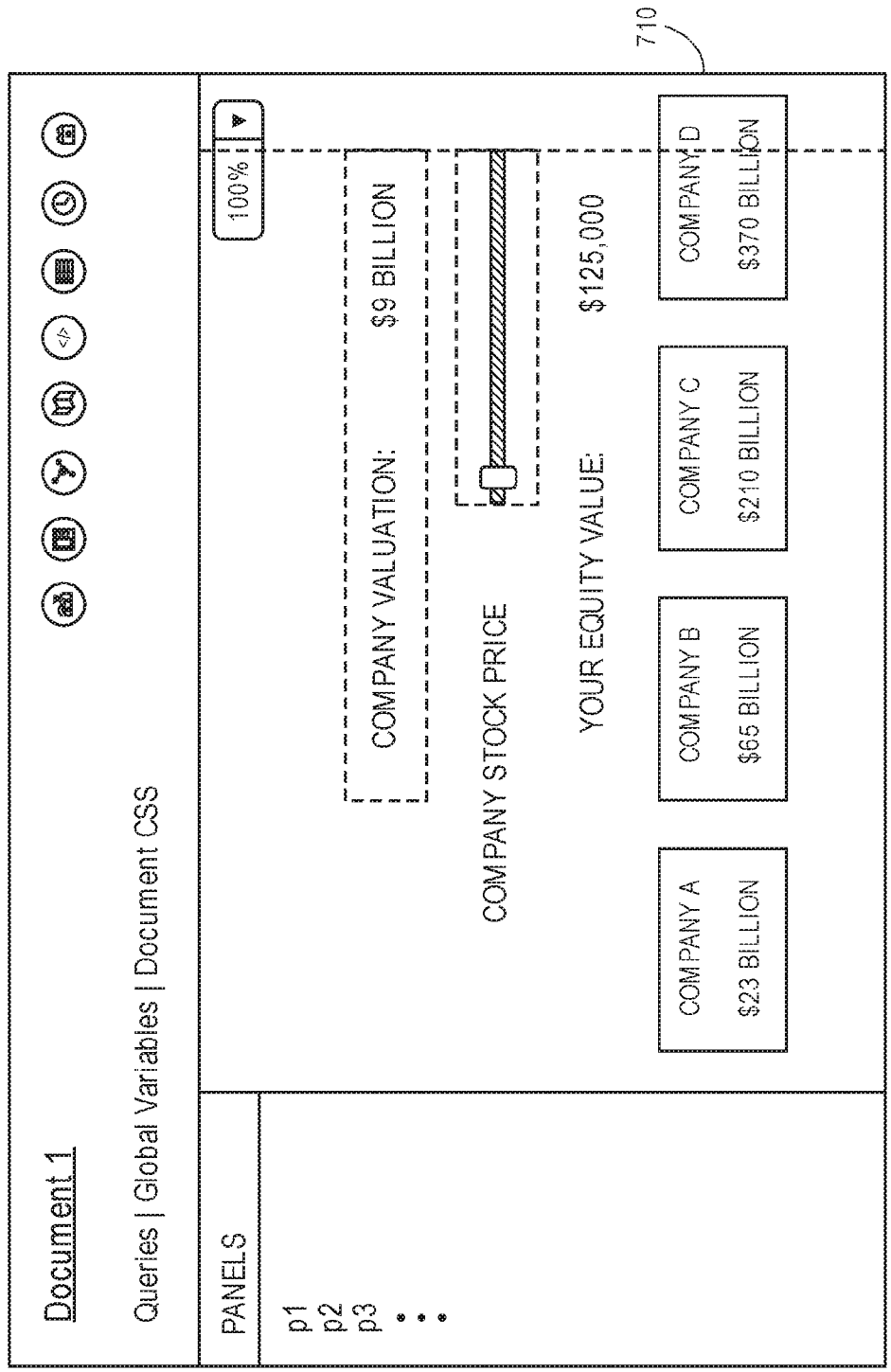
FIGS. 7A-7C illustrate various examples of panels and features provided by a dashboard creation system, according to certain embodiments.
Figure 7B:
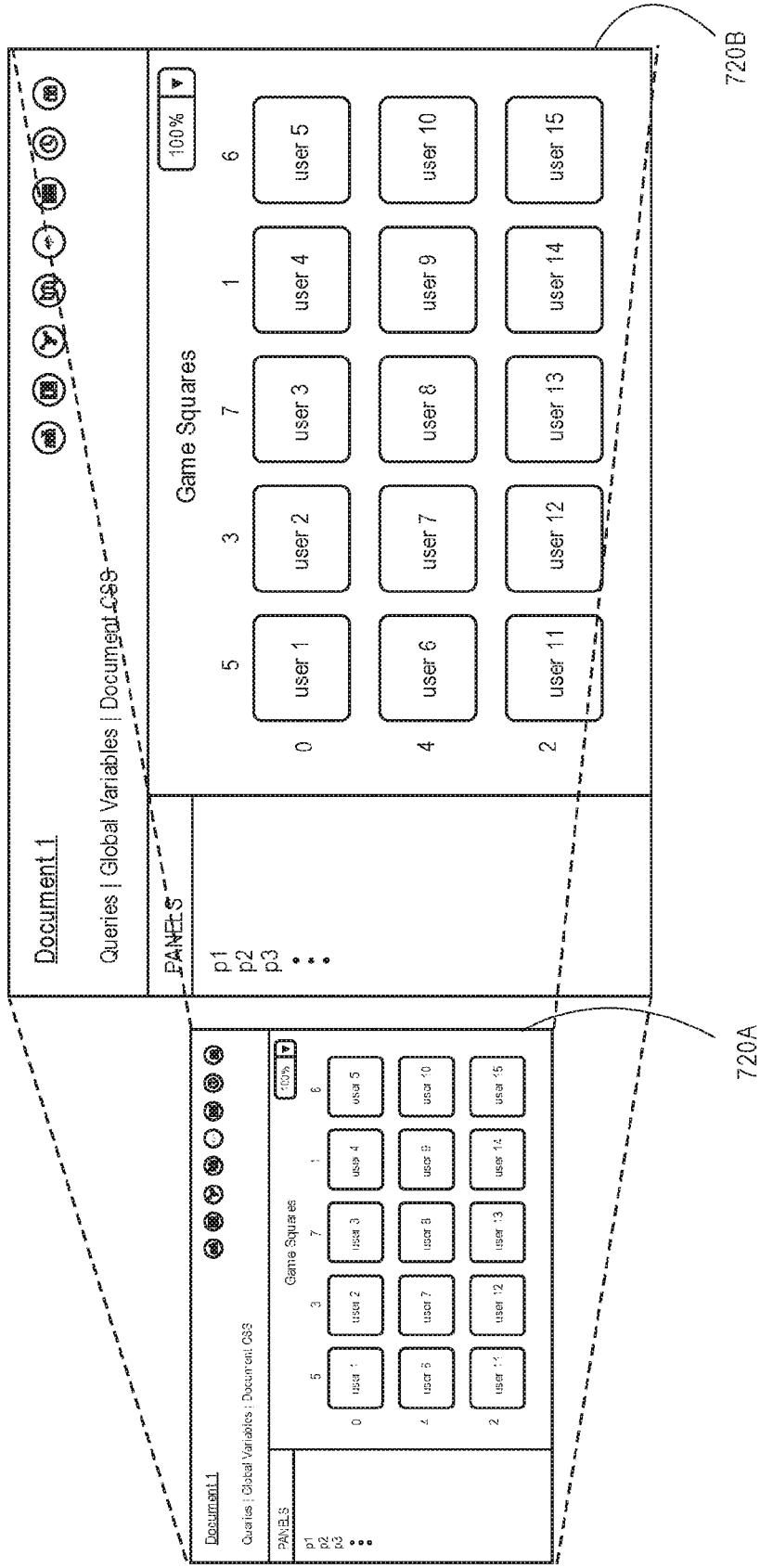
Figure 7C:
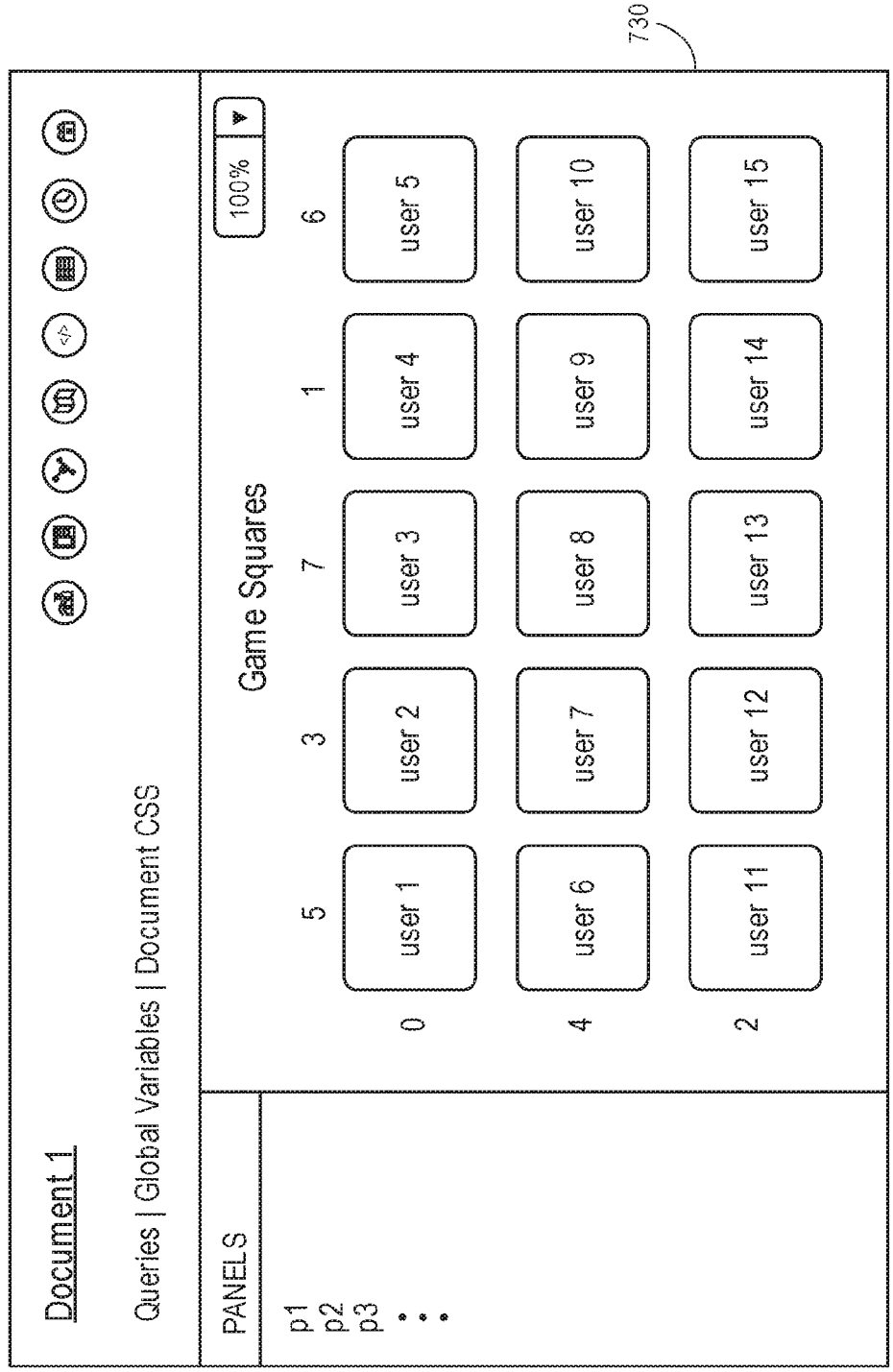

FIG. 1 illustrates one embodiment of a user interface 100 comprising dynamic panels for displaying results of queries performed on one or more data sources. Panels 110 through 150 are some examples of different types of panels that can be included in the user interface 100. Panel 110 and panel 120 are dropdown control panels; panel 130 is a table panel; panel 140 is a line chart panel; and panel 150 is a bar chart panel. Many different types of panels can be included in the user interface 100, depending on the embodiment. For instance, as explained above, types of panels can include charts, controls, graphs, maps, etc. Examples of chart panels may include a bar chart, line chart, pie chart, scatter plot, etc. Examples of control panels may include a date picker, dropdown control, button (e.g., export button, query button, etc.), input box, multiselect box, slider, text area, timeline, etc. Other examples of panels may include a card, image, link (e.g., hyperlink), list, text, graphs, maps, etc. FIGS. 7A-7C illustrate additional examples of types of panels.

A dynamic panel can be linked to one or more other dynamic panels. As mentioned above, the output of a panel can be used in another panel. When the data of a panel depends or relies on the data of another panel, if the data in the source panel changes, the data in the panel that relies on the source panel may also change or be refreshed. For example, in FIG. 1, an example query obtains data regarding National Football League teams from multiple data sources. Panel 110 can be a dropdown control that selects the team to view. Panel 120 can be a dropdown control that selects the season for which to display the games. Panel 130 can be a table that displays the games for the team selected in panel 110 for the season selected in panel 120. Changes to the selected team in panel 110 or the selected season in panel 120 can update the games displayed in panel 130. In some embodiments, panel 140 and panel 150 display statistics related to the games displayed in panel 130; when games displayed in panel 130 change, panel 140 and panel 150 update accordingly.

The query and the settings relating to the display of particular panels can be managed separately. For example, a user interface can provide a section for entering the query and another section for entering display related settings. Separate management of the query and the display settings can allow the panels to be easily updated within the user interface and allow reuse of queries. The page that contains the panels may be referred to as a "document."

In this manner, multiple panels can be used to display different aspects of the result from a query. One query can be run to obtain the needed information, and the result can be parsed and displayed using multiple panels. Display of information can be simplified by using multiple panels. Also, the query can be reused across panels since each panel can extract a portion of the result to display. In certain embodiments, each panel may have its own query and display the result of the query. The panels can also be linked together so that the data from one panel can be used to display the data in another panel.

Exemplary User Interface of Dashboard Creation System

Figure 2A:
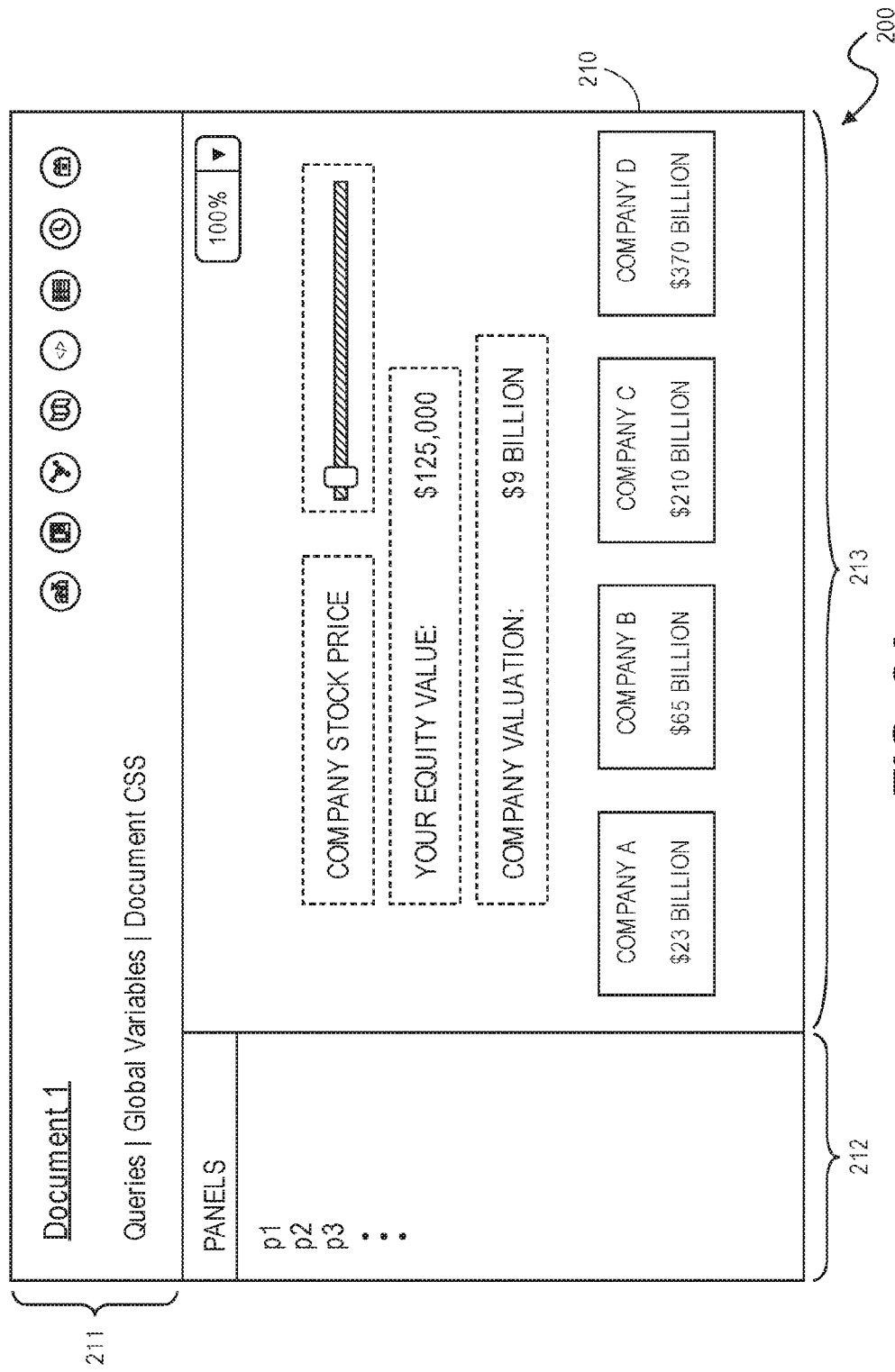
Figure 2B:
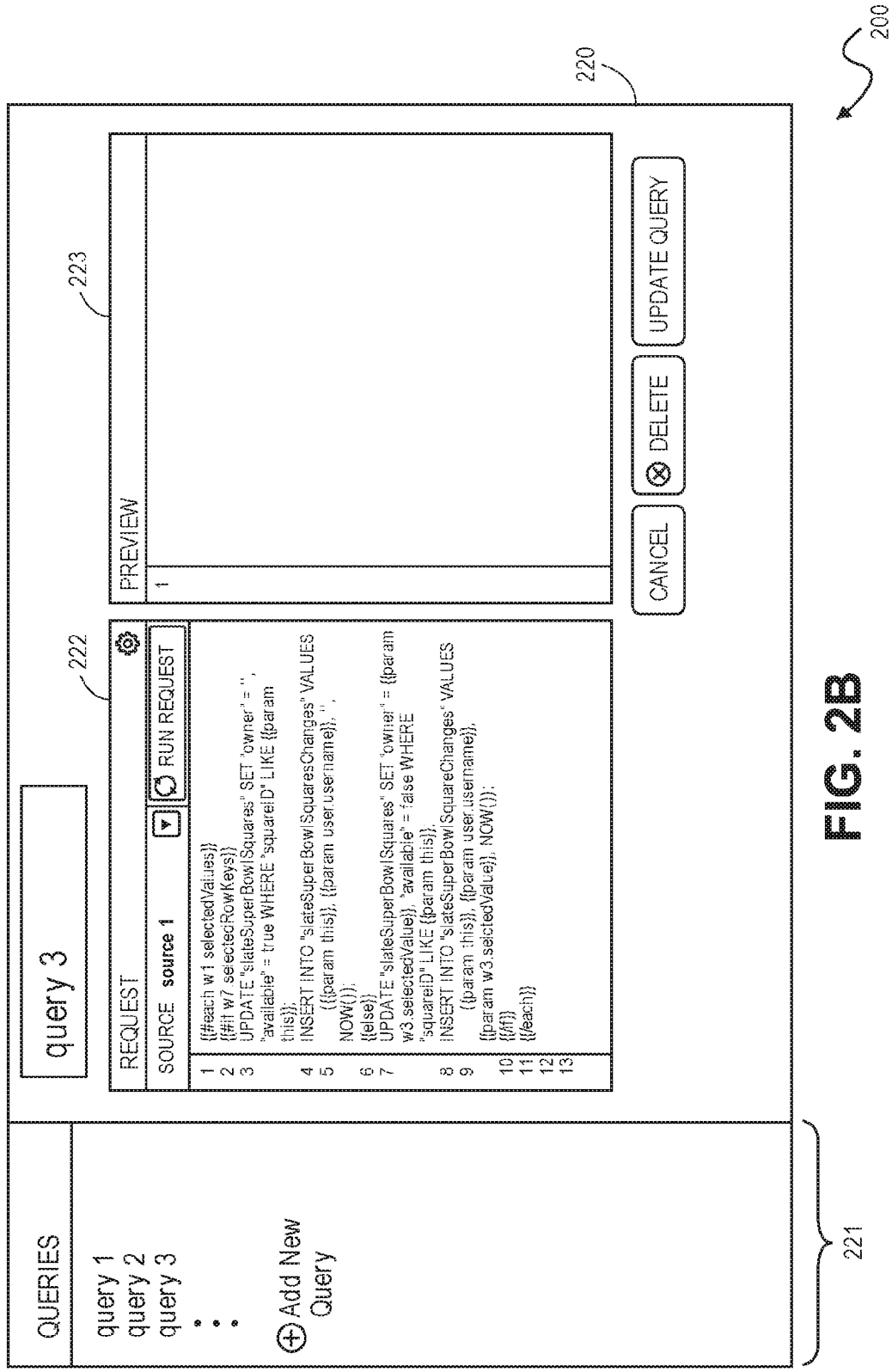

FIGS. 2A-2D illustrate one embodiment of a user interface 200 of a dashboard creation system for creating one or more dynamic panels for use in a dashboard. For example, the user interface 200 can provide functionalities for custom styling, query editing and/or previewing, defining query sub-properties, etc. of panels. FIG. 2A illustrates one embodiment of the main page 210 of the user interface 200. FIG. 2B illustrates one embodiment of the query page 220. FIG. 2C illustrates one embodiment of the global variables page 230. FIG. 2D illustrates one embodiment of the document Cascading Style Sheets (CSS) page 240.

Using the main page 210, the user can create, edit, delete, and manage one or more panels. In one embodiment, the main page 210 includes a top section 211 that displays the name of the document selected, if any; links to the query page 220 (FIG. 2B), the global variables page 230 (FIG. 2C), and the document CSS page 240 (FIG. 2D); and various icons for creating panels and for other features. The main page 210 also includes a panels section 212 that displays the list of panels included in the document. The main page 210 includes a design section 213 where the user can create, organize, and edit panels. In the example of FIG. 2A, the user creates Document 1, which contains panels p1, p2, p3, etc. A panel can be referred to by its name, and the name of the panel can be displayed when the cursor is over a particular panel. For illustrative purposes, certain items in design section 213 are marked with dashed lines to indicate that they are panels; for example, the slider in the top right corner of design section 213 is a panel. Four blocks at the bottom of design section 213 (listing company name and dollar value) are also examples of panels; these panels are shown in solid lines because they have borders.

Moving to FIG. 2B, the query page 220 allows the user to enter a query. For example, a query can be associated with a panel. The example query page 220 may appear when the user clicks on the link to the query page 220 on the main page 210 (FIG. 2A). The query page 220 can display a list of queries 221, for example, stored queries in a database (e.g., template storage 355, 455 in FIGS. 3 and 4). In some embodiments, a query may be reused in other documents. For example, the user can select a query from the list of queries or create a new query. In the example of FIG. 2B, the query page includes a button for adding a new query. The query page 220 can include a code section 222 for entering the query and a preview section 223 for previewing results of execution of the query in code section 222. The user may update or delete a query from the query page 220. The example query in FIG. 2B relates to the panel shown in FIG. 7C and updates the data source(s) to reflect availability of individual squares or cards and to add information relating to the squares or cards (e.g., insert username, time, etc.).

FIG. 2C illustrates the global variables page 230, which allows the user to define global variables associated with a document and/or a panel. The global variables can be referred to by the panels in the document. In addition, the user may also define variables associated with a panel. The variables can be used to link two or more panels together. For instance, the query for a panel may reference a variable in one or more other panels. The panels may be linked in the sense that when the data in a particular linked panel updates, the data in the panels that reference the particular panel also updates. The global variables page 230 can appear when the user clicks on the link to the global variables page 230 on the main page 210 (FIG. 2A). The global variables page 230 can be a pop-up window as illustrated in FIG. 2C or a separate page, for example, like the query page 220. In the example of FIG. 2C, the global variables page 230 shows two variables "options" and "strike." In some embodiments, a global variable is defined for a panel. The panel global variable may be referenced using the format "<panel name>.<global variable name>." For example, if "options" variable is associated with panel p1, and the user can refer to "options" variable as "p1.options." The panel global variables may also be used to link two or more panels together. In some embodiments, global variables may be used to link two or more panels. In one embodiment, global variables may be referred to in a uniform resource locator (URL). The global variables may be modified by changing the values associated with the global variables in the URL.

FIG. 2D illustrates the document CSS page 240 that allows the user to define the style for a document and the panels in the document. The document CSS page 240 can appear when the user clicks on the link to the document CSS page 240 on the main page 210 (FIG. 2A). The document CSS page 240 can be a pop-up window as illustrated in FIG. 2D or a separate page, for example, like the query page 220. Different styles can be applied at various levels of granularity; for example, a style can apply to individual elements within the document or the panel. The document CSS page 240 may also specify the dimensions of the document and the panels in the document. The same CSS may be applied to various panels by referring to a panel's number, title, or type (e.g., dropdown, text, etc.).

In some embodiments, the user interface 200, including the various pages illustrated in FIGS. 2A-2D, can be a web interface. The system may also provide different types or modes of user interfaces for authoring and editing documents and panels. For example, more advanced users can use an interface for directly entering the query, and beginner users can use a simpler interface that allows selection of values for various aspects of a panel (e.g., x value and y value of a chart). Users can share documents with other users and can give other users permission to edit, read only, etc. For example, the system can provide an edit mode (or "author mode"), in which the user can edit all aspects of a panel, e.g., the query for the panel, the display settings for the panel, etc. The system can also provide a read only mode (or "consumer mode"), in which the user can interact with the panels (e.g., select a value for a dropdown control), but may not edit other aspects of panels. In certain embodiments, users can edit panels within a web authoring environment. For example, users may use web technologies to edit the panels and may edit the panels within a web page or web interface.

In one embodiment, the user interface 200 can have two viewing modes: a WYSIWYG (What You See Is What You Get) editor mode and a corresponding read-only consumer mode. In editor mode, built-in panels like bar charts, scatter plots, time series plots, tables, dropdown menus, text boxes, etc. can be added and arranged on the canvas or page. The user can author and edit data queries via a rich editor UI, which can support quickly previewing results for quick debugging. Queries may natively support templating (e.g., via Handlebars) to link to panels, URL parameters, or data from other queries. Panels can also be templatized to link to data from the queries and coordinate with other panels. Additionally, the editor can customize styling for a particular page or document, or deployment. The read-only consumer mode may allow finished web pages to be shared to a set of users that can interact with a page but not edit its layout or setup.

Querying and Displaying Data in Data Sources Using Dynamic Panels

Figure 3:
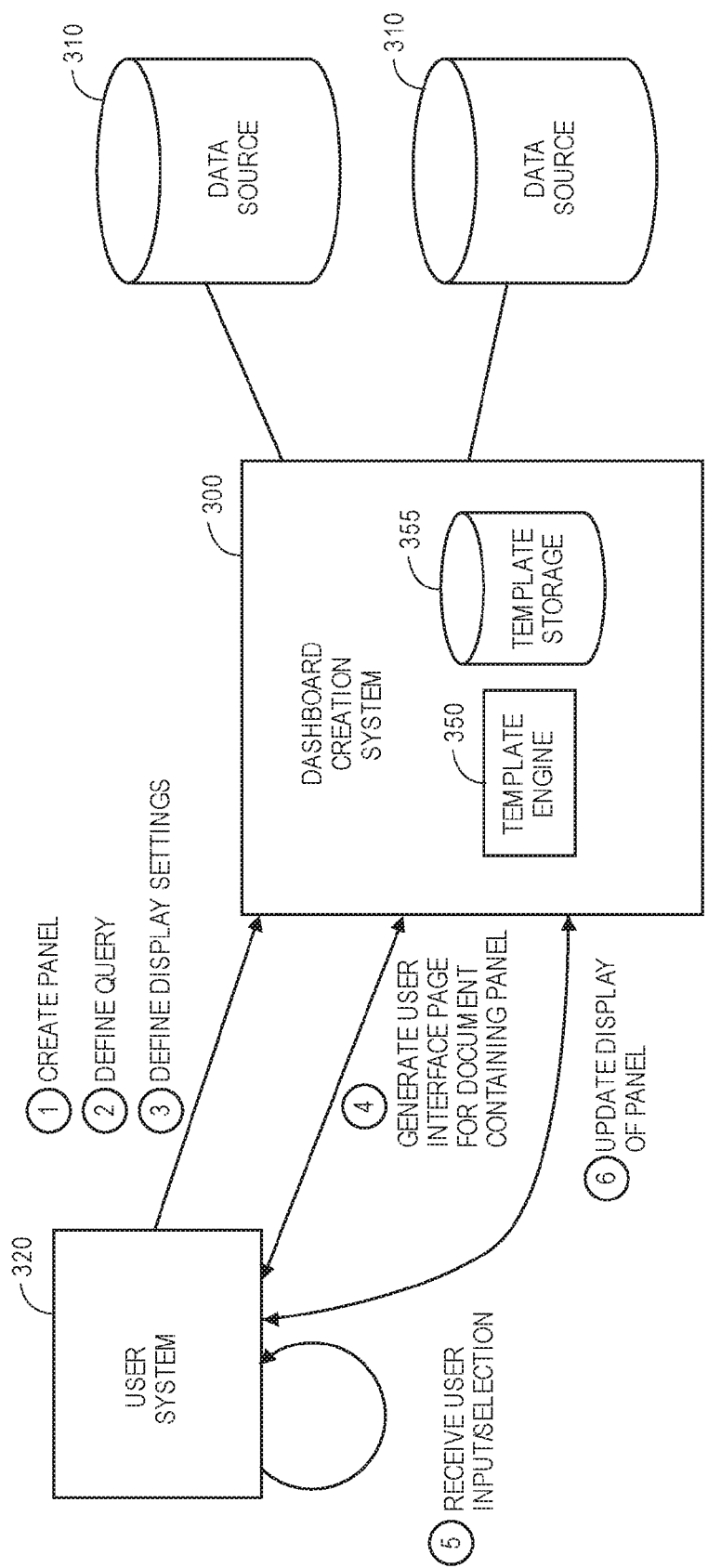
FIG. 3 is a data flow diagram illustrative of the interaction between the various components of a dashboard creation system configured to create and display dynamic panels, according to one embodiment.

FIG. 3 is a data flow diagram illustrative of the interaction between the various components of a dashboard creation system 300 configured to create and display dynamic panels, according to one embodiment. The system 300 can be connected to one or more data sources 310, such as databases. The system 300 may include a template engine 350 and template storage 355. A template system may allow creation of templates that can be used to generate user interface pages, such as web pages. A template system can combine templates and data from data sources to generate user interface pages. For example, a template engine or processor of the template system can render the templates and data from data sources into finished pages. The template engine 350 can render user interface pages based on the documents and/or data in data sources 310. In some embodiments, a template is any text that contains a template placeholder(s) (e.g., double curly brackets: "{{" and "}}"), and the template engine 350 processes the template text with a template context (e.g., an object) and renders the template text to provide the final output. The output can be incorporated into query backends or be used to drive other panels. The template storage 355 can store templates and related information. In certain embodiments, the template storage 355 can also store documents, panels included in documents, and related information. Some examples of template systems may include Handlebars, Mustache, etc. FIG. 3 shows the template engine 350 and the template storage 355 as a part of the system 300, but they may reside in a separate computing system or on separate computing devices from the system 300. For example, the template engine 350 can be external to the system 300. The system 300 may communicate with a user system 320, such as a desktop computer, laptop, mobile phone, tablet, mobile devices, etc. For example, the user system 320 displays user interface pages rendered by the template engine 350. The system 300 may include additional or different components, depending on the embodiment.

At data flow action 1, the user creates a panel. As explained above, a panel can have a query associated with it and display settings associated with it.

At data flow action 2, the user defines a query associated with the panel. As mentioned above, the panels can be data source agnostic and can be associated with data from different types of data sources, such as relational databases SQL, Elasticsearch, etc. The system 300 can connect to and query data from any data source that supports a text-based query language. The system 300 can support different types of query languages and/or tools, depending on the embodiment. In certain embodiments, Handlebars can be used for the queries. In some embodiments, JSON (JavaScript Object Notation) can be used for the queries. In other embodiments, the system 300 can include one adapter for SQL databases and another adapter for REST backends (e.g., Elasticsearch), which may be provided as default adapters. The system 300 can additionally allow the user to transform and selectively extract data out of query results. For example, the user can extract data from JSON query responses using JSONPath.

At data flow action 3, the user defines display settings associated with the panel. The user can define the display settings in the document CSS for the panel. The user can create additional panels and define the query and display settings for each panel. One or more panels may be added to a container. A container may function as a holder for panels. A container can act as a collection of panels that move as a unit. The user can define the layout of the panels within the container, and also define behavior for the container, which can apply to all the panels in the container as a group. The user may add tabs for a container. For example, a container may include multiple tabs, and the user can switch between tabs to view different content. Each tab can act as a separate content space and hold different panels.

At data flow action 4, the system 300 generates the user interface page for the document that contains the panel. When the system 300 receives a request from the user system 320 for a particular document, the system 300 can obtain the requested document, for example, from the template storage 350 and run the query associated with the panels in the documents. The template engine 350 may combine the document, the panels, and the query results in order to generate finished user interface pages. As explained above, one query can be used to obtain data, and different parts of the query can be associated with different panels. For instance, a query q returns columns c1, c2, c3, and c4, and the system 300 creates a text panel whose text is {{q.c1}}, a dropdown panel whose values is {{q.c2}}, and a chart panel whose x values and y values are {{q.c3}} and {{q.c4}}, respectively. Or each panel may have a query associated with it and the result of the query can be associated with the particular panel. The finished user interface pages can be then sent to the user system 320 to be displayed in a user interface.

At data flow action 5, the user system 320 receives user input/selection in the user interface. The user may change the displayed result in the user interface of the user system 320. For example, the user may select a particular value in a dropdown control. Or the user may select a particular panel or an item within a panel. The user input or selection is sent to the system 300.

At data flow action 6, the system 300 updates the display of the panel. For instance, the query may be rerun or the query result may be filtered based on the selected value in a dropdown control. Or actions may be associated with a panel or an item within a panel, and such actions may be performed. For example, selection of a panel or an item within a panel can display options or attributes related to the panel or the item. In one example, the selection of a table row in one panel is linked to another panel that contains more detailed information about the selected row. A table shows a list of games as in FIG. 1, and selecting a game in the table shows more detailed statistics on the selected game in a different panel. Certain details relating to FIG. 3 are further explained below in connection with FIG. 3A.

The system 300 can be highly extensible, and panels can be easily created, edited, and/or removed. In one embodiment, a new panel can be added by creating a web module (e.g., an AngularJS module). A simple web module may be easily created by a suitable module generator (e.g., via Yeoman generator). Similarly, data adapters for new types of data sources can be easily added (e.g., via a java jar).

Linking of Dynamic Panels

Figure 3A:
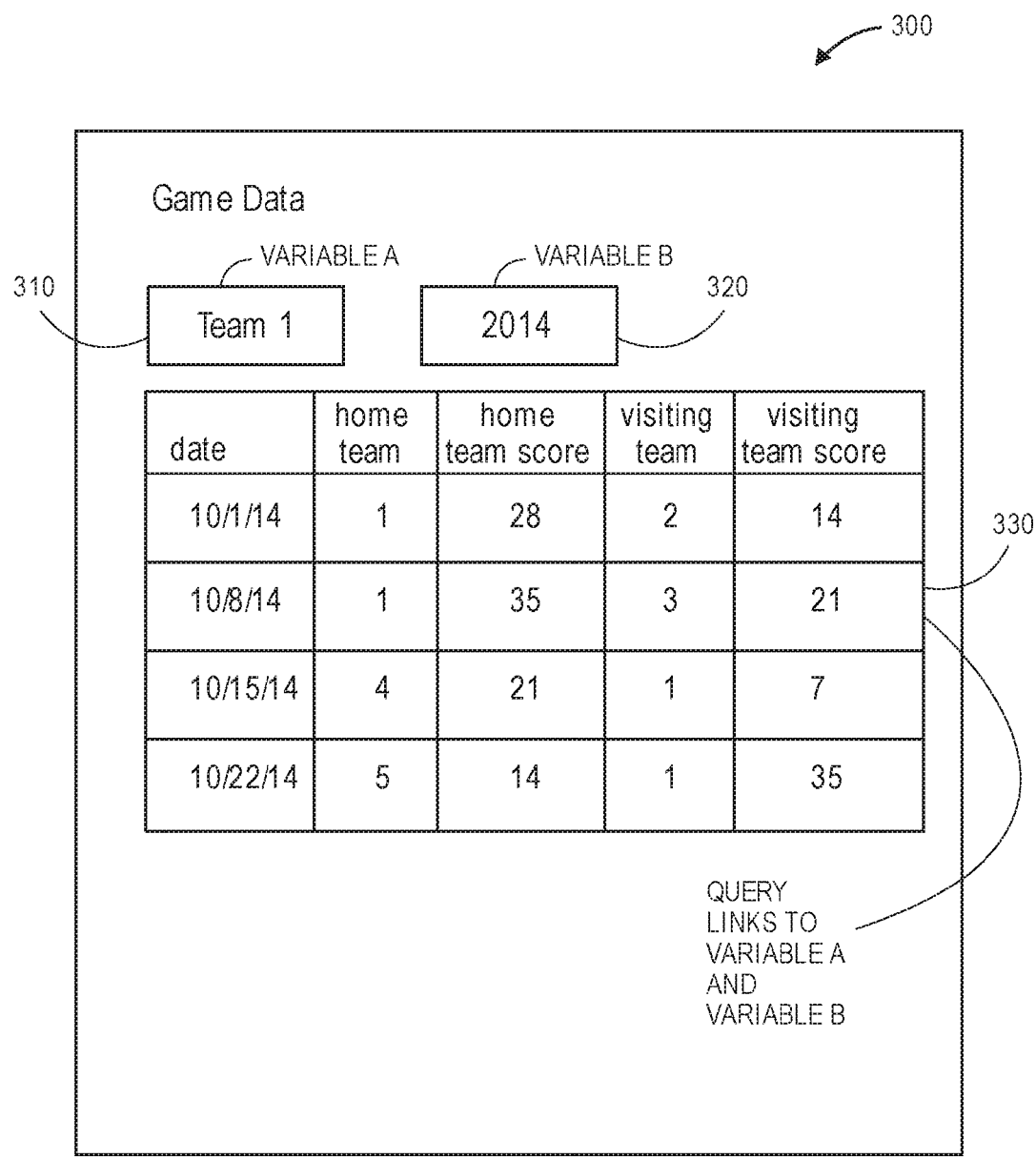
FIG. 3A illustrates one example of linking multiple dynamic panels.

FIG. 3A illustrates one example of linking multiple dynamic panels. In the example of FIG. 3, panels 310, 320, and 330 are similar to panels 110, 120, and 130 in FIG. 1. Panels 310, 320, and 330 may be named p1, p2, and p3, respectively. As mentioned in connection with FIG. 1, panel 310 can be a dropdown control that selects the team to view; panel 320 can be a dropdown control that selects the season for which to display the games; and panel 330 can be a table that displays the games for the team selected in panel 310 for the season selected in panel 320. For example, panels 310 and 320 can have a selected value variable associated with them since they are dropdown controls. The variables may be referenced as p1.selectedValue and p2.selectedValue. The query of panel 330 can reference p1.selectedValue and p2.selectedValue in the WHERE clause of a SELECT statement. For example, the query can be as follows: SELECT column FROM table WHERE team=p1.selectedValue AND season=p2.selectedValue. In the example of FIG. 3A, p1.selectedValue="Team 1" and p2.selectedValue="2014."

The query may refer to panels, variables of panels, and/or global variables as templates, and a template system or language can process the queries and replace any templates with corresponding values. For example, a template can be indicated by double curly brackets "{{" and "}}" in a template system or language, such as Handlebars and Mustache. In the example above, p1.selectedValue and p2.selectedValue may be enclosed in double curly brackets to indicate that they are templates. Therefore, the query for the example above can be written as: SELECT column FROM table WHERE team={{p1.selectedValue}} AND season={{p2.selectedValue}}. The template engine 350 can process and replace the templates with their corresponding values at the time of generating the finished user interface pages. In certain embodiments, the system 300 builds a graph of all the references from the templates and associates the references such that if any of the references change, the corresponding templates are regenerated or refreshed. Templates may also refer to objects other than panels, depending on the embodiment. Using double curly brackets to indicate templates is described above as an example, and any other syntax elements can be used to indicate templates.

In some embodiments, the user can define variables associated with the panels that can be referenced in a query. For example, the user can define variable A for panel 310 and variable B for panel 320, and the query for panel 330 can reference variable A and variable B in the query. For example, variable A and variable B can be associated with the selected value of panel 310 and panel 320, respectively. As explained above, in some embodiments, panels can have global variables associated with them.

Writing to Data Sources Using Dynamic Panels

Figure 4:
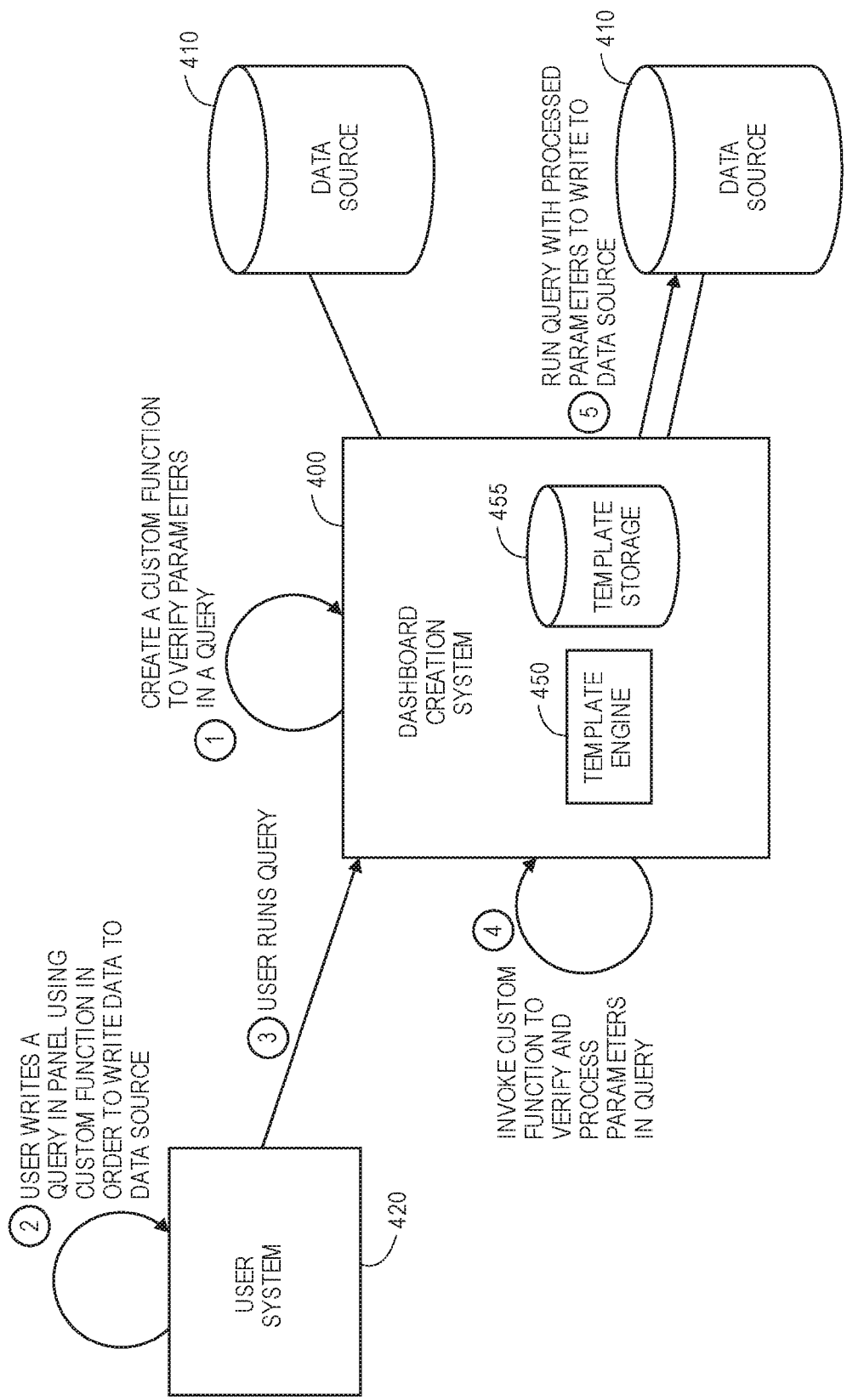
FIG. 4 is a data flow diagram illustrative of the interaction between the various components of a dashboard creation system configured to write to data sources using dynamic panels, according to one embodiment.

FIG. 4 is a data flow diagram illustrative of the interaction between the various components of a dashboard creation system 400 configured to write to data sources using dynamic panels, according to one embodiment. The system 400 and corresponding components of FIG. 4 may be similar to or the same as the system 300 and similarly named components of FIG. 3. The system 400 may include additional or different components, depending on the embodiment.

In some cases, it may be useful to allow users to write to or update the data sources through the panels. For example, the user may want to change the data in a panel and reflect the changes to the data source. The user could also save some selected rows from a table in one document for later use in other documents, or save notes from different users to a table for later reference. In certain cases, the user may also want to rename a portfolio in a database.

The system 400 can allow the users to update the data sources 410 through queries. For example, SQL queries or JSON queries can be used. SQL queries and JSON queries can refer to the panels as templates, and a template system or language like Handlebars or Mustache can process the queries and replace any templates with corresponding values. However, in certain cases, directly replacing the templates with the corresponding values can lead to unintended consequences. For instance, the user may specify an always true condition as the value to be replaced with a template in the WHERE clause of a SQL query, which can result in changing all data. In one example, the user creates a query as follows: UPDATE table SET text="newText" WHERE id={{p1.text}}. If the value of p1.text is "1=1," replacing the template {{p1.text}} with "1=1" would update every row in the table. Accordingly, the system 400 make the queries secure by using a custom function as explained below.

At data flow action 1, the system 400 creates a custom function to verify parameters in a query. For example, an administrator of the system 400 can create the custom function.

In some embodiments, the system 400 uses SQL queries and processes the SQL queries using Handlebars. The custom function can be a Handlebars helper. For example, the custom function can be named "param" and registered with Handlebars. Handlebars can invoke the custom function when processing the SQL queries. The user can use the custom function when using templates in SQL queries.

In one embodiment, the custom function prevents use of text values in templates and only allows parameter values in templates. For example, a variable of a panel used in a template should be a parameter value. Supposing that the variable of the panel referred to in a template is p1.property, the custom function checks whether p1.property is an array. If p1.property is not an array, the custom function replaces "{{param p1.property}}" with a "?" and saves the value of p1.property for reference, for example, in a reference array. If p1.property is an array with a length of n, the custom function replaces "{{param p1.property}}" with a string containing n question marks separated by commas and saves the value of each of element in the array for reference, for example, in a reference array. In this way, the custom function can help create parameterized queries, which contain placeholders such as "?" that can be inserted in query parameters. The SQL engine would escape and not evaluate these parameters, and therefore, parameterized queries can prevent SQL injection. For instance, the expression "1=1" would be escaped and would not be evaluated as a boolean expression; rather it is evaluated as a string.

For example, if p1.property is equal to 1, the custom function processes the SQL query UPDATE table SET text="newText" WHERE id={{param p1.property}} to UPDATE table SET text="newText" WHERE id=?, and stores 1 in the reference array. In another example, if p1.property is equal to an array [1, 2], the custom function processes the SQL query UPDATE table SET text="newText" WHERE id={{param p1.property}} to UPDATE table SET text="newText" WHERE id=(?, ?), and stores 1 and 2 in the reference array. The processed query and parameters can be prepared as a JDBC statement and run against one or more data sources 410. Types of parameters can be preserved (e.g., whether the parameter is a number or a string) by using additional Handlebars helpers.

In other embodiments, the system 400 uses JSON queries and processes the JSON queries using Handlebars and/or Mustache. A JSON query can include three parts: path, method, and body. The path and the body can use templates; since the method generally has a few options, templates may not be used with the method. In order to have different rules for the use of templates, the path, method, and body can be separated into different components of the query. For example, the path and method can be considered as metadata, and the body can be considered as the template.

The custom function can be used on the body of a JSON query. The custom function can be a Handlebars helper. For example, the custom function can be named "{{esc}}" and registered with Handlebars. Handlebars can invoke the custom function when processing JSON queries. The user can use the custom function when using templates in JSON queries. The custom function may verify that all values for templates are valid JSON values (e.g., string, number, object, array, boolean, null, etc.). The custom function can convert the value of templates to string format (e.g., using JSON stringify function). For example, {value: {{esc ptvalue}}} where p1.value is "a" (chars [a]) is evaluated to be {value: "a"}.

The system 400 can also create an additional custom function for string interpolation or for cases where the user wants to use another Handlebars helper (e.g., the join helper). The additional custom function can be a block helper; for example, it can be referred to as {{# esc}}{{/esc}} block helper. In one embodiment, the block helper can evaluate the templates within the block helper, take the result as one string, and convert the one string to string format. In other embodiments, Handlebars evaluates what is inside the block helper, and the helpers within the block helper can convert the result to string format. In certain embodiments, the block helper or helpers convert the result to string format (e.g., by calling JSON stringify function) for security. In one embodiment, JSON stringify function can be called on block helpers for security. Various embodiments described in this disclosure may be implemented separately or in combination as appropriate.

The system 400 may also define rules and features to be implemented in association with the custom function(s). In one example, for the path, the system 400 can require that values for templates are uniform resource identifier (URI) unreserved characters and are not periods. This can prevent the template value from going outside of the intended space in the path (e.g., intended directory). In some embodiments, the system 400 may not allow quotes around templates to avoid a string object from being closed accidentally. The system 400 may also require that all other non-block helpers are nested inside the {{esc}} helper or used inside the {{# esc}}{{/esc}} block helper.

At data flow action 2, the user writes a query in a panel using the custom function in order to write data to a data source 410. The system 400 can require users to use the custom functions when writing queries to write to a data source 410. For instance, the system 400 can return errors for queries that do not use the custom functions or do not use the custom functions properly.

At data flow action 3, the user runs the query. The user can associate the query with a query button panel. The user may run the query by clicking on the query button. The user system 420 can send the user query to the system 400.

At data flow action 4, the system 400 invokes the custom function to verify and process the parameters in the query. Upon receiving the user query from the user system 420, the system 400 can invoke the custom function on the query and format the query appropriately. If the processed query does not conform to the rules associated with the custom function, the system 400 can return an error.

At data flow action 5, the system 400 runs the query with the processed parameters to write to the data source 410. If the processed query is properly written and/or conforms to the rules associated with the custom function, the system 400 runs the query against the data source 410.

In certain embodiments, the system 400 also implements custom functions to verify parameters of queries for reading data. For example, the system 400 can create custom functions (e.g., Handlebars helpers) for verifying table names, column names, alias table names, alias column names, etc. In one embodiment, the system 400 creates Handlebars helpers "table," "column," and "alias" to make sure the table, column, or alias actually exists in the data sources 410. The system 400 can verify a table name or column name by checking that the table name or column name is within the schema of the database. The user can register the alias table name or column name, and the system 400 may verify an alias name by checking that it is registered.

Figure 5:
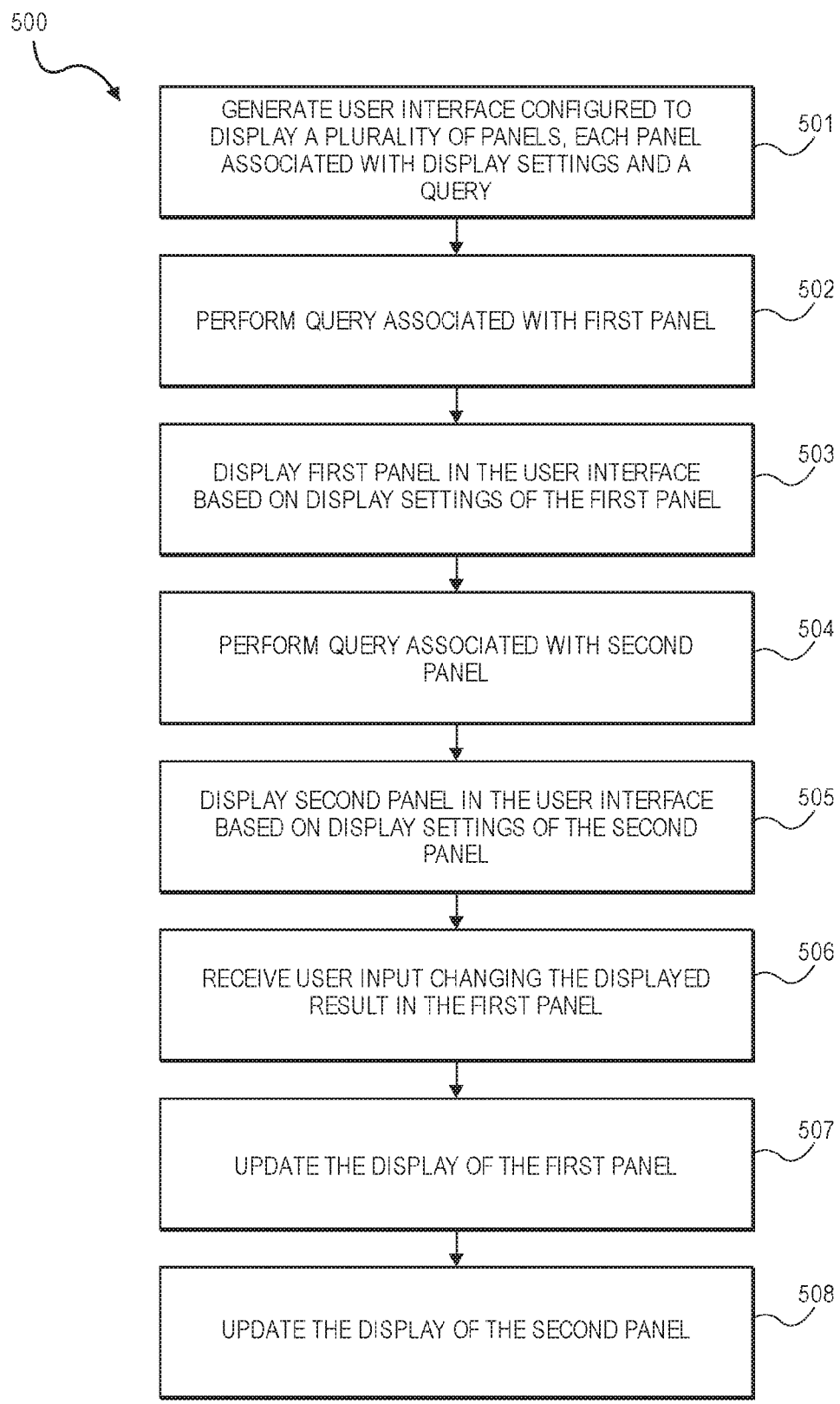
FIG. 5 illustrates a flowchart for creating and displaying dynamic panels in a user interface, according to certain embodiments.

FIG. 5 illustrates a flowchart for creating and displaying dynamic panels in a user interface, according to certain embodiments. The process 500 may be implemented by one or more systems described with respect to FIGS. 3 and 4. For illustrative purposes, the process 500 is explained below in connection with the system 300 in FIG. 3 and the example of FIG. 3A. Certain details relating to the process 500 are explained in more detail with respect to FIGS. 1-4. Depending on the embodiment, the process 500 may include fewer or additional blocks, and the blocks may be performed in an order that is different than illustrated.

At block 501, the system 300 generates a user interface configured to display a plurality of panels, each panel associated with display settings and a query. At block 502, the system 300 performs the query associated with a first panel. The first panel can be panel 310 in FIG. 3A.

At block 503, the system 300 displays the first panel in the user interface based on the display settings of the first panel. The query of panel 310 can be run to obtain the list of teams to display in panel 310. The list of teams can be displayed according the document CSS of panel 310. One team from the list of teams may be displayed in panel 310 as the default value. For example, panel 310 shows the first team in the list.

Similarly, the system 300 can perform the query associated with panel 320 and display panel 320 in the user interface based on the display settings of panel 320. One season from the list of seasons may be displayed in panel 320 as the default value. For example, panel 320 shows the most current season in the list.

At block 504, the system 300 performs the query associated with a second panel. The second panel can be panel 330 in FIG. 3A.

At block 505, the system 300 displays the second panel in the user interface based on the display settings of the second panel. The query of panel 330 can be run to obtain the list of games to display in panel 330. As explained above, the query of panel 330 obtains the list of games to display for the team selected in panel 310 and the season selected in panel 320. The list of games can be displayed according the document CSS of panel 330.

At block 506, the system 300 receives user input changing the displayed result in the first panel. For example, the user selects Team 1 from the list of teams in panel 310, and panel 310 is updated to show Team 1 as selected. The user selection is sent to the system 300.

At block 507, the system 300 updates the display of the first panel. If there are any changes to be made to panel 310, the system 300 can refresh panel 310, e.g., by rerunning the query and/or regenerating panel 310 through the template engine 350. In the example of FIG. 3A, panel 310 is a dropdown control, so the system 300 may not have to update panel 310.

At block 508, the system 300 updates the display of the second panel. Since the query of panel 330 links to panel 310, panel 330 is also updated to display games for Team 1 for the season selected in panel 320. For example, the query for panel 330 can be rerun. In this manner, linked panels can be updated dynamically.

Figure 6:
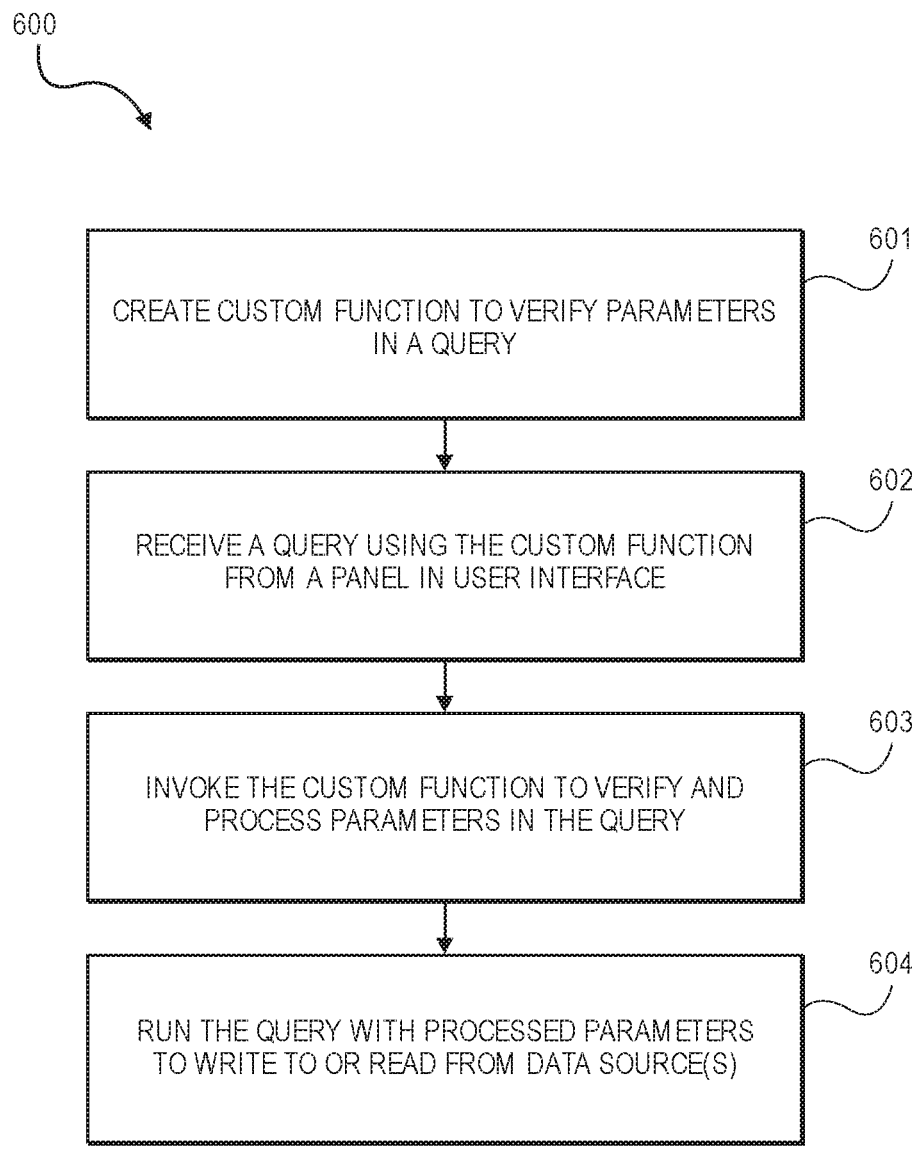
FIG. 6 illustrates a flowchart for writing to data sources using dynamic panels, according to certain embodiments.

FIG. 6 illustrates a flowchart for writing to data sources using dynamic panels, according to certain embodiments. The process 600 may be implemented by one or more systems described with respect to FIGS. 3 and 4. For illustrative purposes, the process 600 is explained below in connection with the system 400 in FIG. 4. Certain details relating to the process 600 are explained in more detail with respect to FIGS. 1-5. Depending on the embodiment, the process 600 may include fewer or additional blocks, and the blocks may be performed in an order that is different than illustrated.

At block 601, the system 400 creates a custom function to verify parameters in a query. The custom functions may be Handlebars helpers explained above, such as param helper, {{esc}} helper, {{# esc}}{{/esc}} block helper, etc.

At block 602, the system 400 receives a query using the custom function from a panel in the user interface. The user writes a query that uses the custom function.

At block 603, the system 400 invokes the custom function to verify and process parameters in the query. In one embodiment, the custom function replaces the parameters with respective placeholders and stores respective values corresponding to the parameters in an array. In another embodiment, the custom function changes respective values corresponding to the parameters to string format.

At block 604, the system 400 runs the query with the processed parameters to write to or read from the data source(s) 410.

FIGS. 7A-7C illustrate various examples of panels and features provided by a dashboard creation system, according to certain embodiments. FIG. 7A illustrates the alignment indicator feature for panels. As the user moves a panel within the user interface, other panels that line up with the panel being moved can be distinguished in the user interface to indicate that they are aligned. For example, the borders of the other panels can be highlighted, displayed in a different color, etc. In one embodiment, one or more guidelines appear to show that the panels are lined up (e.g., at one edge).

FIG. 7B illustrates the auto zoom feature for panels. When the finished user interface pages are displayed in the user interface, the user may resize the window of the user interface. In such case, the document and/or the panels in the user interface pages may be resized based on the width of the window. For example, if the window size is increased, the size of the document and/or the panels in the UI pages increase to fit the width of the window. Or if the window size is decreased, the size of the document and/or the panels in the UI pages decrease to fit the width of the window. This can be different from typical web pages where the content of the web pages remains the same regardless of whether the window of the browser is resized or not.

FIG. 7C illustrates another example of a panel 730. This panel may be referred to as a "card" panel since it includes one or more cards that can be selected. A card panel may refer to visualization of certain information within a card-like display. Either a single card or multiple cards can be selected, and the selections can be linked to other panels. In the example of FIG. 7C, different cards indicate a particular score combination for the outcome of a game. Users may sign up for a particular score combination in order to predict the outcome, and the user names are listed in the card they sign up for.

In certain embodiments, the user login information may be saved as global variables so that they can be accessible within the document. The user login information can include the group, email address, name, etc. of the user. The user login information may be used in queries, for example, to check permissions, etc.

Dashboard Creation Application

The system for providing a plurality of dynamic panels in a user interface as explained above may also be referred to as a "Dashboard Creation Application." The Dashboard Creation Application (DCA) can be an extensible WYSI-WYG (What You See Is What You Get) web application for quickly and easily creating interactive, data-driven web pages. For example, the Dashboard Creation Application can easily create interactive dashboards which support light-weight filtering and drill-down operations on top of arbitrary data storage systems or data sources.

In one embodiment, the Dashboard Creation Application enables analysts to author dashboards of visualizations for easy consumption by end users. It will provide a number of panels like charts, tables, and images, in a pluggable architecture so analysts can add custom panels for particular deployments. For example, a standard plug-in structure can be used across systems and products. Panels will be interactive and coordinated, and support filtering/aggregations to create drill-down style analysis. The dashboard author will have fine control over the layout and styling of the panels contained in each Dashboard Creation Application dashboard. The Dashboard Creation Application will be deployable on top of any collection of other products for presentation and dashboarding use cases because it is agnostic to the underlying data store.

In various embodiments, the Dashboard Creation Application may perform one or more of the functions noted below:

Create dashboards which use Elasticsearch or SQL data sources

Add chart, table, text, dropdown, map, multi-select, etc. panels to dashboards

Create custom panels

Create basic links between panels

Move and resize panels via the UI

Edit the query template associated with a panel through the UI

Create/manage new documents through the UI

Flexibility around which portions of a JSON response can be accessed and used as data for the panels Share a pool of queries/variables across all panels to make it easier to build dashboards Abstracting out features across backends into the "basic" or "beginner" UI In some embodiments, the Dashboard Creation Application integrates closely with other products so that more use cases can be covered by combining the tools appropriately. The numbers and types of users reached can be increased by improving the usability and expressiveness of the UI available to end users for building dashboards. In various embodiments, the Dashboard Creation Application may implement one or more of the functions noted below:

Expansion of the formatting UI—users can make very specific visual edits to the panels through the UI Filters and/or panels from other applications or web-based applications can be dropped into and used inside Dashboard Creation Application.

Implementation Mechanisms

According to one embodiment, the techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
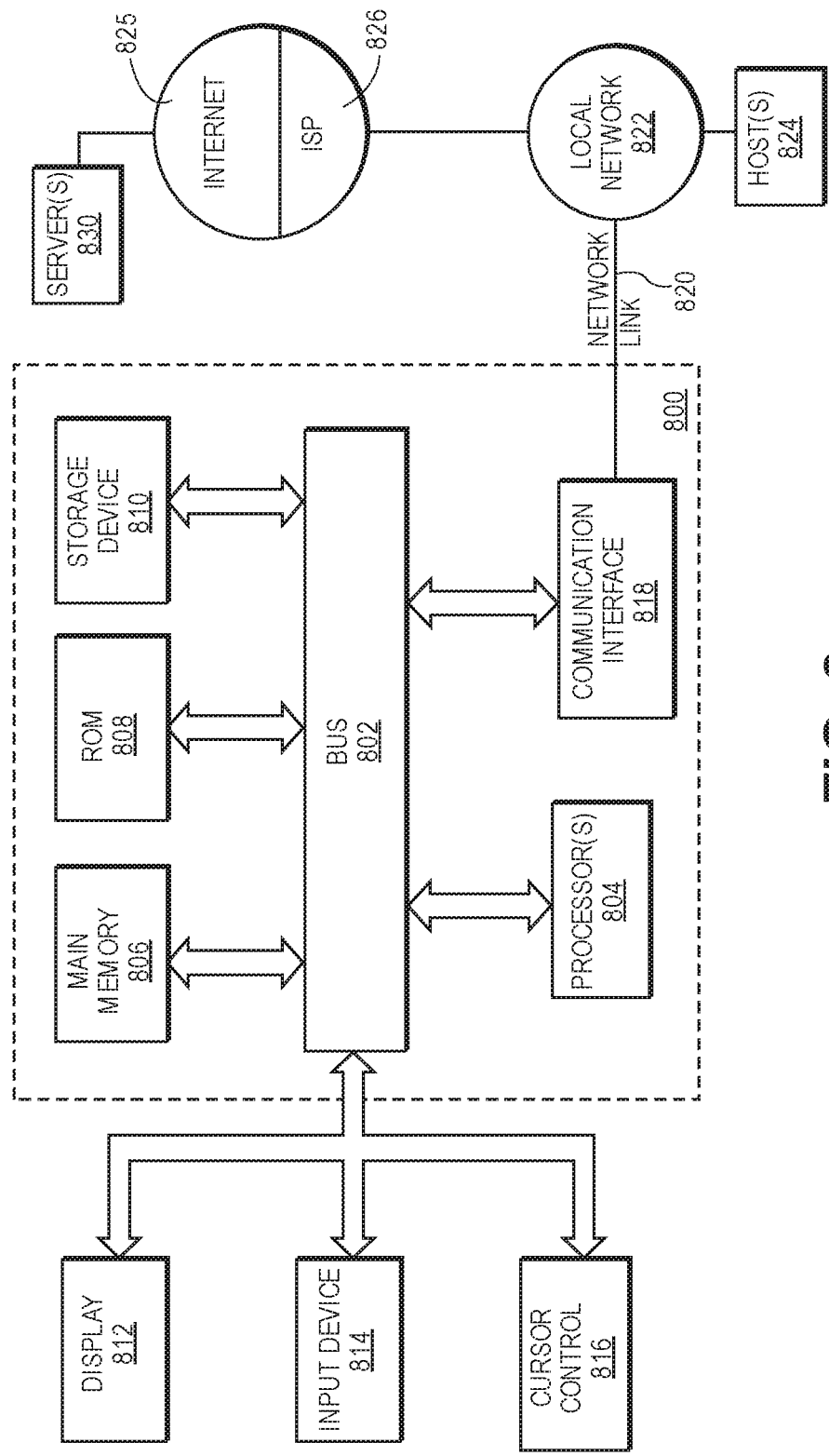
FIG. 8 illustrates a computer system with which certain methods discussed herein may be implemented.

For example, FIG. 8 shows a block diagram that illustrates a computer system 800 upon which an embodiment may be implemented. For example, the computing system 800 may comprise a system for providing a plurality of dynamic panels in a user interface. Other computing systems discussed herein may include any portion of the circuitry and/or functionality discussed with reference to system 800. For instance, the system 300 and/or 400 can each include some or all of the components and/or functionality of the system 800.

Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicate with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 825. Local network 822 and Internet 825 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 825, ISP 826, local network 822 and communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system configured to display data from one or more data sources, the computer system comprising:
   one or more hardware computer processors configured to execute code in order to cause the system to:
   provide a first user interface configured to display a plurality of panels including at least a first panel and a second panel, wherein the first panel is associated with a first variable and a first query, and wherein the second panel is associated with a second query;
   provide a second user interface configured to include a coding of the second query that comprises a first section of code that comprises an identifier of the first variable, wherein the second query is written in a first programming language and the first section of code is written in a template syntax;
   in response to a first user input:
   execute the first query associated with the first panel to cause first data to be retrieved from the one or more data sources, wherein the execution of the first query also causes the first variable associated with the first panel to be defined with a first value; and
   update the first panel in the first user interface to include at least a portion of the first data retrieved from the one or more data sources; and
   in response to a second user input changing the first variable associated with the first panel to be defined with a second value:
   execute the second query associated with the second panel to cause second data to be retrieved from the one or more data sources, wherein the second data is retrieved, based at least in part, on the second value of the first variable associated with the first query of the first panel; and
   update the second panel in the first user interface to include at least a portion of the second data.

2. The computer system of claim 1, wherein the template syntax comprises at least one of: Handlebars, Mustache, or a semantic template language.

3. The computer system of claim 1, wherein the one or more hardware computer processors are further configured to execute code in order to cause the system to:
   execute any query comprising a second section of code written in the first programming language and a third section of code written in the template syntax;
   wherein the second section of code includes an instruction to write new information to the one or more data sources; and
   wherein the third section of code comprises a function call on a parameter referencing the new information.

4. The computer system of claim 3, wherein the one or more hardware computer processors are further configured to execute code in order to cause the system to:
   write the new information to the one or more data sources.

5. The computer system of claim 4, wherein the one or more hardware computer processors are further configured to execute code in order to cause the system to:
   process the parameter according to the function call before executing the second section of code.

6. The computer system of claim 5, wherein processing the parameter according to the function call comprises:
   storing the new information in an array; and
   replacing a coding of the second section of code with different code.

7. The computer system of claim 6, wherein processing the parameter according to the function call further comprises:
   preserving a type of the new information.

8. The computer system of claim 5, wherein processing the parameter according to the function call further comprises:
   changing the parameter to have a string format.

9. The computer system of claim 4, wherein Java DataBase Connectivity (JDBC) code is used to write the new information to the one or more data sources.

10. The computer system of claim 3, wherein the function is written in the template syntax.

11. The computer system of claim 3,
   wherein the first panel and the second panel are each referenced as a template that is rendered by a template engine; and
   the function is registered with the template engine.

12. The computer system of claim 1, wherein the one or more hardware computer processors are further configured to execute code in order to cause the system to:
   prior to executing the first query associated with the first panel, invoke one or more functions to determine whether a table, row, or a column referenced in the first query exists in the one or more data sources.

13. The computer system of claim 1, wherein the one or more hardware computer processors are further configured to execute code in order to cause the system to:
   generate the first user interface according to a style defined in a cascading style sheet, and
   wherein the first user interface is configured to display the first panel according to first display settings associated with the first panel, the first display settings configured to format the first data as part of at least one of: a chart, a control, a map, a table, or a text box.

14. The computer system of claim 1, wherein the first programming language comprises Structured Query Language (SQL) or JavaScript Object Notation (JSON).

* * * * *